United States Patent
Jin et al.

(10) Patent No.: US 11,026,274 B2
(45) Date of Patent: Jun. 1, 2021

(54) SESSION CONNECTION ESTABLISHMENT METHOD AND SYSTEM, AND RELATED DEVICE

(71) Applicant: Huawei Technologies Co., Ltd., Shenzhen (CN)

(72) Inventors: Yinghao Jin, Shanghai (CN); Hong Li, Shanghai (CN); Feng Han, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 125 days.

(21) Appl. No.: 16/370,216

(22) Filed: Mar. 29, 2019

(65) Prior Publication Data
US 2019/0230726 A1 Jul. 25, 2019

Related U.S. Application Data

(63) Continuation of application No. PCT/CN2017/103770, filed on Sep. 27, 2017.

(30) Foreign Application Priority Data

Sep. 30, 2016 (CN) .......................... 201610879162.6

(51) Int. Cl.
*H04W 76/11* (2018.01)
*H04W 76/12* (2018.01)
(Continued)

(52) U.S. Cl.
CPC .............. *H04W 76/11* (2018.02); *H04W 8/22* (2013.01); *H04W 12/06* (2013.01); *H04W 60/00* (2013.01);
(Continued)

(58) Field of Classification Search
CPC ..... H04W 76/11; H04W 76/12; H04W 76/27; H04W 8/22; H04W 12/06; H04W 60/00; H04W 80/10
See application file for complete search history.

(56) References Cited

U.S. PATENT DOCUMENTS

| | | | | |
|---|---|---|---|---|
| 2010/0075659 A1* | 3/2010 | Kim | ...................... | H04W 76/11 455/422.1 |
| 2010/0238990 A1* | 9/2010 | Rao | ........................ | H04W 24/08 375/228 |

(Continued)

FOREIGN PATENT DOCUMENTS

| CN | 102685921 A | 9/2012 |
|---|---|---|
| CN | 103002543 A | 3/2013 |

OTHER PUBLICATIONS

LG Electronics, SA WG2 Meeting #113AH, S2-161037, "Session management decoupled with attachment", Feb. 23-26, 2016, Sophia Antipolis, France, 6 pages.

(Continued)

*Primary Examiner* — Jael M Ulysse
(74) *Attorney, Agent, or Firm* — Leydig, Voit & Mayer, Ltd.

(57) ABSTRACT

Embodiments of the present disclosure provide a session connection establishment method and system, and a related device. The method may include: receiving, by a first radio access network device, an initial attach request sent by a terminal device; sending, by the first radio access network device, the initial attach request to a first core network device; receiving, by the first radio access network device, an initial attach request feedback that is sent by the first core network device in response to the initial attach request, where the initial attach request feedback includes session identifiers of at least two user plane session connections, and
(Continued)

sending, by the first radio access network device, session configuration information to the terminal device.

20 Claims, 16 Drawing Sheets

(51) Int. Cl.
  *H04W 76/27* (2018.01)
  *H04W 8/22* (2009.01)
  *H04W 12/06* (2021.01)
  *H04W 60/00* (2009.01)
  *H04W 80/10* (2009.01)
  *H04W 76/15* (2018.01)
(52) U.S. Cl.
  CPC ........... *H04W 76/12* (2018.02); *H04W 76/27* (2018.02); *H04W 80/10* (2013.01); *H04W 76/15* (2018.02)

(56) References Cited

U.S. PATENT DOCUMENTS

| | | | | |
|---|---|---|---|---|
| 2011/0058520 | A1* | 3/2011 | Keller | H04W 76/11 370/328 |
| 2012/0076099 | A1* | 3/2012 | Yin | H04L 12/4633 370/329 |
| 2012/0076120 | A1* | 3/2012 | Kowali | H04W 76/11 370/338 |
| 2012/0177004 | A1* | 7/2012 | Yano | H04L 47/825 370/331 |
| 2012/0224564 | A1* | 9/2012 | Paisal | H04N 7/148 370/331 |
| 2013/0007286 | A1* | 1/2013 | Mehta | H04W 76/10 709/227 |
| 2013/0142182 | A1* | 6/2013 | Gundavelli | H04W 8/02 370/338 |
| 2013/0303088 | A1* | 11/2013 | Watfa | H04W 72/0406 455/41.2 |
| 2013/0331063 | A1* | 12/2013 | Cormier | H04W 12/06 455/411 |
| 2014/0003357 | A1* | 1/2014 | Ejzak | H04W 76/12 370/329 |
| 2014/0105011 | A1* | 4/2014 | Chandramouli | H04W 4/08 370/230 |
| 2014/0105145 | A1* | 4/2014 | Gao | H04W 84/045 370/329 |
| 2014/0133386 | A1* | 5/2014 | Rohit | H04W 16/26 370/315 |
| 2014/0146783 | A1* | 5/2014 | Kim | H04W 48/17 370/329 |
| 2014/0241158 | A1* | 8/2014 | Anthony, Jr. | H04L 45/306 370/235 |
| 2014/0335830 | A1* | 11/2014 | Wu | H04W 12/069 455/411 |
| 2014/0341124 | A1* | 11/2014 | Ronneke | H04W 76/11 370/329 |
| 2014/0376559 | A1* | 12/2014 | Diwane | H04L 45/02 370/401 |
| 2015/0117408 | A1* | 4/2015 | Kedalagudde | H04W 36/0027 370/331 |
| 2015/0139084 | A1* | 5/2015 | Kaczmarska-Wojtania | H04W 76/12 370/329 |
| 2015/0139182 | A1* | 5/2015 | Dowlatkhah | H04W 36/00837 370/331 |
| 2015/0223284 | A1* | 8/2015 | Jain | H04W 72/044 370/329 |
| 2015/0373699 | A1* | 12/2015 | Xu | H04W 80/045 370/329 |
| 2016/0232627 | A1* | 8/2016 | Smith | G06Q 30/0611 |
| 2016/0277168 | A1* | 9/2016 | Kaczmarska-Wojtania | H04W 8/20 |
| 2016/0286459 | A1* | 9/2016 | Enomoto | H04L 65/1069 |
| 2017/0245316 | A1* | 8/2017 | Salkintzis | H04W 48/16 |

OTHER PUBLICATIONS

China Mobile, LG Electronics, SA WG2 Meeting #113AH, S2-161299, "China Mobile, LG Electronics", Feb. 23-26, 2016, Sophia Antipolis, France, 4 pages.

3GPP TR 23.799 V1.0.0 (Sep. 2016), 3rd Generation Partnership Project; Technical Specification Group Services and System Aspects; Study on Architecture for Next Generation System (Release 14), 423 pages.

LG Electronics, "Session management decoupled with attachment," SA WG2 Meeting #113AH, S2-161037 (revision of S2-16xxxx), Sophia Antipolis, France, pp. 1-6, 3rd Generation Partnership Project, Valbonne, France (Feb. 23-26, 2016).

China Mobile, LG Electronics, "Solution to Session Management," SA WG2 Meeting #113AH, S2-161299 (revision of S2-161182), Sophia Antipolis, France, pp. 1-4, 3rd Generation Partnership Project, Valbonne, France (Feb. 23-26, 2016).

"3rd Generation Partnership Project; Technical Specification Group Services and System Aspects; Study on Aritecture for Next Generation System (Release 14)," 3GPP TR 23.799 V1.0.0, pp. 1-423, 3rd Generation Partnership Project, Valbonne, France (Sep. 2016).

* cited by examiner

SESSION CONNECTION ESTABLISHMENT METHOD AND SYSTEM, AND RELATED DEVICE

CROSS-REFERENCE TO RELATED APPLICATIONS

This application is a continuation of International Application No. PCT/CN2017/103770, filed on Sep. 27, 2017, which claims priority to Chinese Patent Application No. 201610879162.6, filed on Sep. 30, 2016. The disclosures of the aforementioned applications are hereby incorporated by reference in their entireties.

TECHNICAL FIELD

The present disclosure relates to the field of communications technologies, and in particular, to a session connection establishment method and system, and a related device.

BACKGROUND

Wireless communications technologies are advancing rapidly, and wireless communications services will vary greatly in the future. A 5th Generation (5G) wireless communications network is oriented to different application scenarios such as an ultra high definition video, virtual reality, the massive Internet of Things, and the Internet of Vehicles. Different scenarios impose different requirements on network mobility, security, a latency, reliability, and even a charging mode. For example, a service characterized by high-speed mobility has a relatively high requirement for network performance indicators such as service continuity and a handover latency, and a machine type communication (MTC) service has a relatively high requirement for a quantity of service connections but has no requirement for a handover latency or mobility. In a future 5G communications system, to meet different requirements of different services for network performance, a network in the future needs to have an on-demand capability, that is, flexible network slice configuration needs to be implemented, to divide a physical network into a plurality of virtual network slices, so that each virtual network slice is oriented to different application scenario requirements.

It can be learned from the foregoing descriptions that, services vary greatly in the future, and a development trend of the 5G network is to establish different network slices for different types of services by using a virtualization technology. Therefore, how to combine different network slices to meet communication requirements of various types of services of a terminal device is a problem that needs to be urgently resolved.

SUMMARY

Embodiments of the present disclosure provide a session connection establishment method and system, and a related device, to resolve a problem in an existing communication technology that communication efficiency is low because different session connections cannot be established based on requirements of different services during initial attachment of a terminal device.

According to a first aspect, an embodiment of the present disclosure provides a session connection establishment method, and the method may include:

receiving, by a first radio access network device, an initial attach request sent by a terminal device; sending, by the first radio access network device, the initial attach request to a first core network device; receiving, by the first radio access network device, an initial attach request feedback that is sent by the first core network device in response to the initial attach request, where the initial attach request feedback includes session identifiers of at least two user plane session connections, the session identifier is used to indicate a session connection established between the first radio access network device and a second core network device and/or the session identifier is used to indicate a session connection established between a second radio access network device and the second core network device, the first core network device is configured to execute a common control plane function of a core network, and the second core network device is configured to execute a user plane function of the core network; and sending, by the first radio access network device, session configuration information to the terminal device, where the session configuration information includes the session identifiers of the at least two user plane session connections. That is, a plurality of user plane session connections are established for the terminal device in an initial attach procedure of the terminal device, so that when performing different data services, the terminal device can select, based on quality of service (QoS) requirements of the different services, user plane session connections corresponding to different second core network devices (network slices), to improve data service transmission quality and efficiency.

With reference to the first aspect, in a second possible implementation, the initial attach request feedback further includes an identifier that is of a radio access network device establishing a session connection to the second core network device and that is corresponding to each of the at least two user plane session connections, and the session configuration information further includes the identifier of the radio access network device. That is, the identifier that is of the radio access network device establishing the session connection to the second core network device and that is corresponding to each session connection is carried in the initial attach request feedback, so that the terminal device can establish a plurality of user plane session connections to different core network devices by using different access network devices, and can further provide different levels or different types of services by using different radio access network devices, to meet QoS requirements of different data services.

With reference to the first aspect or the first possible implementation of the first aspect, in a second possible implementation, the initial attach request includes a first initial attach request or a second initial attach request; the first initial attach request includes at least one of channel state information between the terminal device and the first radio access network device, channel state information between the terminal device and the second radio access network device, and an identifier of the second radio access network device; and the second initial attach request includes preset service identifiers respectively corresponding to at least two preset services of the terminal device and includes at least one of the following: network slice identifiers respectively corresponding to the at least two preset services, an identifier of the first radio access network device, and the identifier of the second radio access network device, and the network slice identifier is used by the first core network device to select the second core network device from a corresponding network slice based on the network slice identifier. That is, session connections are separately determined for the terminal device on the first core network device side and the terminal device side, to meet requirements of different services of the terminal device in different application scenarios.

With reference to the second possible implementation of the first aspect, in a third possible implementation, the first initial attach request information further includes network slice capability information of the terminal device, and the network slice capability information is used to indicate a quantity of network slices that can be accessed by the terminal device and/or a network slice that can be accessed by the terminal device. That is, when the terminal device side is responsible for determining a session connection, information such as the network slice supported by the terminal device and the quantity of network slices supported by the terminal device is carried in the initial attach request, so that the first core network device that finally obtains the information can properly allocate a network slice to the terminal device based on the information and finally determine a second core network device in the network slice, to improve session establishment quality and improve final communication quality.

With reference to any one of the first aspect or the first to the third possible implementations of the first aspect, in a fourth possible implementation, the session identifier is used to indicate the session connection established between the second radio access network device and the second core network device; or the session identifier is used to indicate the session connection established between the first radio access network device and the second core network device and is used to indicate the session connection established between the second radio access network device and the second core network device; before the sending, by the first radio access network device, session configuration information to the terminal device, the method further includes: sending, by the first radio access network device, a first request to the second radio access network device, where the first request includes at least one of the following: a first identifier of the terminal device, at least one of the session identifiers of the at least two user plane session connections, and an identifier of the second core network device, and the first identifier is used to uniquely identify the terminal device within a control range of the first radio access network device; and receiving, by the first radio access network device, a first request feedback that is sent by the second radio access network device in response to the first request, where the first request feedback includes at least one of establishment status information of the at least two user plane session connections, the identifier of the second radio access network device, a session identifier of a session connection that is in the at least two user plane session connections and that has been successfully established in the second radio access network device, and a second identifier allocated by the second radio access network device to the terminal device, and the second identifier is used to uniquely identify the terminal device within a coverage area of the second radio access network device. That is, when a user plane session connection of the terminal device needs to be established to the second core network device by using the second radio access network device, the first radio access network device that has learned of a related session identifier notifies the second radio access network device of information such as a specific user plane session connection that needs to be established for the terminal device and a context of the terminal device. In this way, a second terminal device can establish a related session connection for the terminal device in advance.

With reference to any one of the first aspect or the first to the fourth possible implementations of the first aspect, in a fifth possible implementation, the session configuration information further includes session status information, the session status identifier information is used to indicate a session status of a session connection corresponding to the session identifier, and the session status includes a radio resource connection RRC connected mode, an RRC idle mode, and a third RRC mode. That is, the first radio access network device sends session status information of a plurality of user plane session connections to the terminal device, so that the terminal device learns of, based on the session status information in the session configuration information, a session status of a session connection established for the terminal device, and performs parameter configuration on the corresponding session connection.

According to a second aspect, an embodiment of the present disclosure provides a session connection establishment method, and the method may include:

sending, by a terminal device, an initial attach request to a first radio access network device; and receiving, by the terminal device, session configuration information sent by the first radio access network device, where the session configuration information is sent after the first radio access network device receives an initial attach request feedback that is sent by a first core network device in response to the initial attach request, the session configuration information includes session identifiers of at least two user plane session connections, the session identifier is used to indicate a session connection established between the first radio access network device and a second core network device and/or the session identifier is used to indicate a session connection established between a second radio access network device and the second core network device, the first core network device is configured to execute a common control plane function of a core network, and the second core network device is configured to execute a user plane function of the core network. That is, a plurality of user plane session connections are established for the terminal device in an initial attach procedure of the terminal device, so that when performing different data services, the terminal device can select, based on quality of service (QoS) requirements of the different services, user plane session connections corresponding to different second core network devices (network slices), to improve data service transmission quality and efficiency.

With reference to the second aspect, in a second possible implementation, the initial attach request feedback further includes an identifier that is of a radio access network device establishing a session connection to the second core network device and that is corresponding to each of the at least two user plane session connections, and the session configuration information further includes the identifier of the radio access network device.

With reference to the second aspect or the first possible implementation of the second aspect, in a third possible implementation, the method further includes: performing, by the terminal device, data session transmission on the at least two user plane session connections based on the session identifier and the identifier of the radio access network device. The terminal device performs access by using a corresponding radio access network device and transmits data of different services by using a plurality of established user plane session connections, to meet various requirements of the different services and improve communication efficiency.

According to a third aspect, an embodiment of the present disclosure provides a session connection establishment method, and the method may include:

receiving, by a first core network device, an initial attach request sent by a first radio access network device; and sending, by the first core network device, an initial attach request feedback to the first radio access network device in response to the initial attach request, where the initial attach request feedback includes session identifiers of at least two user plane session connections, the session identifier is used to indicate a session connection established between the first radio access network device and a second core network device and/or the session identifier is used to indicate a session connection established between a second radio access network device and the second core network device, the first core network device is configured to execute a common control plane function of a core network, and the second core network device is configured to execute a user plane function of the core network.

According to a fourth aspect, an embodiment of the present disclosure provides a session connection establishment method, and the method may include:

receiving, by a first radio access network device, an initial attach request sent by a terminal device; sending, by the first radio access network device, the initial attach request to a third core network device, where the third core network device is configured to execute a common control plane function of a core network; when the first radio access network device needs to establish a session connection, receiving, by the first radio access network device, a second request sent by a fourth core network device, where the second request includes related information used to instruct the first radio access network device to establish a user plane session connection to the fourth core network device, and the fourth core network device is configured to execute a user plane function and a session management function of the core network; and sending, by the first radio access network device, a second request feedback to the fourth core network device in response to the second request, where the second request feedback includes session status information used to indicate whether the user plane session connection is successfully established. That is, not only a plurality of user plane session connections are established for a user during initial attachment of the terminal device, but also the related session management function is changed to be implemented by the fourth core network device that is configured to execute the user plane function. Different from the prior art in which session management is performed by a first core network device on a common control plane, a fourth core network device in each network slice can more conveniently manage a session corresponding to the fourth core network device, to improve session management efficiency.

With reference to the fourth aspect, in a first possible implementation, the first radio access network device receives an initial attach request feedback that is sent by the third core network device in response to the initial attach request, where the initial attach request feedback includes session identifiers of at least two user plane session connections, and the session identifier is used to indicate a session connection established between the first radio access network device and the fourth core network device and/or the session identifier is used to indicate a session connection established between a second radio access network device and the fourth core network device; and the first radio access network device sends session configuration information to the terminal device, where the session configuration information includes the session identifiers of the at least two user plane session connections.

With reference to the fourth aspect or the first possible implementation of the fourth aspect, in a second possible implementation, when the first radio access network device does not need to establish a session connection, after the sending, by the first radio access network device, the initial attach request to a third core network device, the method includes: receiving, by the first radio access network device, an initial attach request feedback that is sent by the third core network device in response to the initial attach request, where the initial attach request feedback includes session identifiers of at least two user plane session connections, and the session identifier is used to indicate a session connection established between a second radio access network device and the fourth core network device; and sending, by the first radio access network device, session configuration information to the terminal device, where the session configuration information includes the session identifiers of the at least two user plane session connections. That is, when the first radio access network device does not need to establish a session connection, the fourth core network device still needs to send, to the first radio access network device, an identifier of a session connection established for the terminal device, so that the first radio access network device finally notifies the terminal device. Therefore, in this case, the initial attach request feedback sent by the first core network device includes only a session identifier of the session connection between the second radio access network device and the fourth core network device.

With reference to the fourth aspect, the first possible implementation of the fourth aspect, or the second possible implementation of the fourth aspect, in a third possible implementation, the initial attach request feedback further includes an identifier that is of a radio access network device establishing a session connection to the fourth core network device and that is corresponding to each of the at least two user plane session connections, and the session configuration information further includes the identifier of the radio access network device. That is, the identifier that is of the radio access network device establishing the session connection to the fourth core network device and that is corresponding to each session connection is carried in the initial attach request feedback, so that the terminal device can establish a plurality of user plane session connections to different core network devices by using different access network devices, and can further provide different levels or different types of services by using different radio access network devices, to meet QoS requirements of different data services.

With reference to any one of the fourth aspect or the first to the third possible implementations of the fourth aspect, in a fourth possible implementation, the second request further includes at least one of a first identifier of the terminal device, an identifier of the first radio access network device, and current quality of service information of a user plane session connection, and the first identifier is used to uniquely identify the terminal device within a control range of the first core network device. The second request may further carry more session establishment related information, so that the first radio access network device more properly establishes a session connection to the fourth core network device, to improve session establishment quality.

According to a fifth aspect, an embodiment of the present disclosure provides a session connection establishment method, and the method may include:

receiving, by a second radio access network device, a third request sent by a fourth core network device, where the third request includes related information used to instruct the second radio access network device to establish a user plane session connection to the fourth core network device, and the fourth core network device is configured to execute a user plane function and a session management function of a core network; and sending, by the second radio access network device, a third request feedback to the fourth core network device in response to the third request, where the third request feedback includes session status information used to indicate whether the user plane session connection is successfully established.

According to a sixth aspect, an embodiment of the present disclosure provides a session connection establishment method, and the method may include:

receiving, by a third core network device, an initial attach request sent by a first radio access network device, where the third core network device is configured to execute a common control plane function of a core network; sending, by the third core network device, a session establishment request to a fourth core network device, where the fourth core network device is configured to execute a user plane function and a session management function of the core network; receiving, by the third core network device, a session establishment request feedback that is sent by the fourth core network device in response to the session establishment request, where the session establishment request feedback includes session identifiers of at least two user plane session connections, and the session identifier is used to indicate a session connection established between the first radio access network device and the fourth core network device and/or the session identifier is used to indicate a session connection established between a second radio access network device and the fourth core network device; and sending, by the third core network device, an initial attach request feedback to the first radio access network device in response to the initial attach request, where the initial attach request feedback includes the session identifiers of the at least two user plane session connections.

According to a seventh aspect, an embodiment of the present disclosure provides a session connection establishment method, and the method may include:

receiving, by a fourth core network device, a session establishment request sent by a third core network device, where the third core network device is configured to execute a common control plane function of a core network, and the fourth core network device is configured to execute a user plane function and a session management function of the core network; sending, by the fourth core network device, a second request to a first radio access network device and/or sending a third request to a second radio access network device, where the second request includes related information used to instruct the first radio access network device to establish a user plane session connection to the fourth core network device, and the third request includes related information used to instruct the second radio access network device to establish a user plane session connection to the fourth core network device; and sending, by the fourth core network device, a session establishment request feedback to the third core network device in response to the session establishment request, where the session establishment request feedback includes session identifiers of at least two user plane session connections, and the session identifier is used to indicate a session connection established between the first radio access network device and the fourth core network device and/or the session identifier is used to indicate a session connection established between the second radio access network device and the fourth core network device.

With reference to the seventh aspect, in a first possible implementation, before the sending, by the fourth core network device, a session establishment request feedback to the third core network device in response to the session establishment request, the method further includes: when the fourth core network device sends the second request to the first radio access network device, receiving, by the fourth core network device, a second request feedback that is sent by the first radio access network device in response to the second request, where the second request feedback includes session status information used to indicate whether the user plane session connection between the first radio access network device and the fourth core network device is successfully established; and when the fourth core network device sends the third request to the second radio access network device, receiving, by the fourth core network device, a third request feedback that is sent by the first radio access network device in response to the third request, where the third request feedback includes session status information used to indicate whether the user plane session connection between the second radio access network device and the fourth core network device is successfully established.

According to an eighth aspect, an embodiment of the present disclosure provides a session connection establishment method, and the method may include:

sending, by a terminal device, an initial attach request to a first radio access network device; and receiving, by the terminal device, session configuration information sent by the first radio access network device, where the session configuration information is sent after the first radio access network device receives an initial attach request feedback that is sent by a first core network device in response to the initial attach request, the session configuration information includes session identifiers of at least two user plane session connections, the session identifier is used to indicate a session connection established between the first radio access network device and a fourth core network device and/or the session identifier is used to indicate a session connection established between a second radio access network device and the fourth core network device, a third core network device is configured to execute a common control plane function of a core network, and the fourth core network device is configured to execute a user plane function and a session management function of the core network.

According to a ninth aspect, an embodiment of the present disclosure provides a radio access network device. The radio access network device is a first radio access network device and includes a processor, a memory, and a transceiver, the memory is configured to store an instruction, and the processor is configured to invoke the instruction stored in the memory, to perform the following operations:

receiving, by using the transceiver, an initial attach request sent by a terminal device;

sending the initial attach request to a first core network device by using the transceiver;

receiving, by using the transceiver, an initial attach request feedback that is sent by the first core network device in response to the initial attach request, where the initial attach request feedback includes session identifiers of at least two user plane session connections, the session identifier is used to indicate a session connection established between the first radio access network device and a second core network device and/or the session identifier is used to indicate a session connection established between a second radio access network device and the second core network device, the first core network device is configured to execute a common control plane function of a core network, and the second core network device is configured to execute a user plane function of the core network; and sending session configuration information to the terminal device by using the transceiver, where the session configuration information includes the session identifiers of the at least two user plane session connections.

With reference to the ninth aspect, in a first possible implementation, the initial attach request feedback further includes an identifier that is of a radio access network device establishing a session connection to the second core network device and that is corresponding to each of the at least two user plane session connections, and the session configuration information further includes the identifier of the radio access network device.

With reference to the ninth aspect or the first possible implementation of the ninth aspect, in a second possible implementation, the initial attach request includes a first initial attach request or a second initial attach request; the first initial attach request includes at least one of channel state information between the terminal device and the first radio access network device, channel state information between the terminal device and the second radio access network device, and an identifier of the second radio access network device; and the second initial attach request includes preset service identifiers respectively corresponding to at least two preset services of the terminal device and includes at least one of the following: network slice identifiers respectively corresponding to the at least two preset services, an identifier of the first radio access network device, and the identifier of the second radio access network device, and the network slice identifier is used by the first core network device to select the second core network device from a corresponding network slice based on the network slice identifier.

With reference to the second possible implementation of the ninth aspect, in a third possible implementation, the first initial attach request information further includes network slice capability information of the terminal device, and the network slice capability information is used to indicate a quantity of network slices that can be accessed by the terminal device and/or a network slice that can be accessed by the terminal device.

With reference to any one of the ninth aspect or the first to the third possible implementations of the ninth aspect, in a fourth possible implementation, the session identifier is used to indicate the session connection established between the second radio access network device and the second core network device; or the session identifier is used to indicate the session connection established between the first radio access network device and the second core network device and is used to indicate the session connection established between the second radio access network device and the second core network device; before sending the session configuration information to the terminal device by using the transceiver, the processor is further configured to: send a first request to the second radio access network device by using the transceiver, where the first request includes at least one of the following: a first identifier of the terminal device, at least one of the session identifiers of the at least two user plane session connections, and an identifier of the second core network device, and the first identifier is used to uniquely identify the terminal device within a control range of the first radio access network device; and receive, by using the transceiver, a first request feedback that is sent by the second radio access network device in response to the first request, where the first request feedback includes at least one of establishment status information of the at least two user plane session connections, the identifier of the second radio access network device, a session identifier of a session connection that is in the at least one user plane session connection and that has been successfully established in the second radio access network device, and a second identifier allocated by the second radio access network device to the terminal device, and the second identifier is used to uniquely identify the terminal device within a coverage area of the second radio access network device.

With reference to any one of the ninth aspect or the first to the fourth possible implementations of the ninth aspect, in a fifth possible implementation, the session configuration information further includes session status information, the session status identifier information is used to indicate a session status of a session connection corresponding to the session identifier, and the session status includes a radio resource connection RRC connected mode, an RRC idle mode, and a third RRC mode.

According to a tenth aspect, an embodiment of the present disclosure provides a terminal device. The terminal device may include a processor, a memory, and a transceiver, the memory is configured to store an instruction, and the processor is configured to invoke the instruction stored in the memory, to perform the following operations:

sending an initial attach request to a first radio access network device by using the transceiver; and receiving, by using the transceiver, session configuration information sent by the first radio access network device, where the session configuration information is sent after the first radio access network device receives an initial attach request feedback that is sent by a first core network device in response to the initial attach request, the session configuration information includes session identifiers of at least two user plane session connections, the session identifier is used to indicate a session connection established between the first radio access network device and a second core network device and/or the session identifier is used to indicate a session connection established between a second radio access network device and the second core network device, the first core network device is configured to execute a common control plane function of a core network, and the second core network device is configured to execute a user plane function of the core network.

With reference to the tenth aspect, in a second possible implementation, the initial attach request feedback further includes an identifier that is of a radio access network device establishing a session connection to the second core network device and that is corresponding to each of the at least two user plane session connections, and the session configuration information further includes the identifier of the radio access network device.

With reference to the tenth aspect or the first possible implementation of the fifth aspect, in a second possible implementation, the processor is further configured to:

perform data session transmission on the at least two user plane session connections based on the session identifier and the identifier of the radio access network device.

According to an eleventh aspect, an embodiment of the present disclosure provides a core network device. The core network device is a first core network device and may include a processor, a memory, and a transceiver, the memory is configured to store an instruction, and the processor is configured to invoke the instruction stored in the memory, to perform the following operations:

receiving, by using the transceiver, an initial attach request sent by a first radio access network device; and sending, by using the transceiver, an initial attach request feedback to the first radio access network device in response to the initial attach request, where the initial attach request feedback includes session identifiers of at least two user plane session connections, the session identifier is used to indicate a session connection established between the first radio access network device and a second core network device and/or the session identifier is used to indicate a session connection established between a second radio access network device and the second core network device, the first core network device is configured to execute a common control plane function of a core network, and the second core network device is configured to execute a user plane function of the core network.

According to a twelfth aspect, an embodiment of the present disclosure provides a radio access network device. The radio access network device is a first radio access device and may include a processor, a memory, and a transceiver, the memory is configured to store an instruction, and the processor is configured to invoke the instruction stored in the memory, to perform the following operations:

receiving, by using the transceiver, an initial attach request sent by a terminal device;

sending the initial attach request to a third core network device by using the transceiver, where the third core network device is configured to execute a common control plane function of a core network;

when the first radio access network device needs to establish a session connection, receiving, by using the transceiver 403, a second request sent by a fourth core network device, where the second request includes related information used to instruct the first radio access network device to establish a user plane session connection to the fourth core network device, and the fourth core network device is configured to execute a user plane function and a session management function of the core network; and sending, by using the transceiver, a second request feedback to the fourth core network device in response to the second request, where the second request feedback includes session status information used to indicate whether the user plane session connection is successfully established.

Optionally, the processor is further configured to receive, by using the transceiver, an initial attach request feedback that is sent by the third core network device in response to the initial attach request, where the initial attach request feedback includes session identifiers of at least two user plane session connections, and the session identifier is used to indicate a session connection established between the first radio access network device and the fourth core network device and/or the session identifier is used to indicate a session connection established between a second radio access network device and the fourth core network device; and send session configuration information to the terminal device by using the transceiver, where the session configuration information includes the session identifiers of the at least two user plane session connections.

Optionally, the processor is further configured to: when the first radio access network device does not need to establish a session connection, after sending the initial attach request to the third core network device by using the transceiver, receive, by using the transceiver, an initial attach request feedback that is sent by the third core network device in response to the initial attach request, where the initial attach request feedback includes session identifiers of at least two user plane session connections, and the session identifier is used to indicate a session connection established between a second radio access network device and the fourth core network device; and send session configuration information to the terminal device by using the transceiver, where the session configuration information includes the session identifiers of the at least two user plane session connections.

Optionally, the initial attach request feedback further includes an identifier that is of a radio access network device establishing a session connection to the fourth core network device and that is corresponding to each of the at least two user plane session connections, and the session configuration information further includes the identifier of the radio access network device.

Optionally, the second request further includes at least one of a first identifier of the terminal device, an identifier of the first radio access network device, and current quality of service information of a user plane session connection, and the first identifier is used to uniquely identify the terminal device within a control range of a first core network device.

According to a thirteenth aspect, an embodiment of the present disclosure provides a radio access network device. The radio access network device is a second radio access network device and may include a processor, a memory, and a transceiver, the memory is configured to store an instruction, and the processor is configured to invoke the instruction stored in the memory, to perform the following operations:

receiving, by using the transceiver, a third request sent by a fourth core network device, where the third request includes related information used to instruct the second radio access network device to establish a user plane session connection to the fourth core network device, and the fourth core network device is configured to execute a user plane function and a session management function of a core network; and sending, by using the transceiver, a third request feedback to the fourth core network device in response to the third request, where the third request feedback includes session status information used to indicate whether the user plane session connection is successfully established.

According to a fourteenth aspect, an embodiment of the present disclosure provides a core network device. The core network device is a third core network device and may include a processor, a memory, and a transceiver, the memory is configured to store an instruction, and the processor is configured to invoke the instruction stored in the memory, to perform the following operations:

receiving, by using the transceiver, an initial attach request sent by a first radio access network device, where the third core network device is configured to execute a common control plane function of a core network;

sending a session establishment request to a fourth core network device by using the transceiver, where the fourth core network device is configured to execute a user plane function and a session management function of the core network;

receiving, by using the transceiver, a session establishment request feedback that is sent by the fourth core network device in response to the session establishment request, where the session establishment request feedback includes session identifiers of at least two user plane session connections, and the session identifier is used to indicate a session connection established between the first radio access network device and the fourth core network device and/or the session identifier is used to indicate a session connection established between a second radio access network device and the fourth core network device; and sending, by using the transceiver, an initial attach request feedback to the first radio access network device in response to the initial attach request, where the initial attach request feedback includes the session identifiers of the at least two user plane session connections.

According to a fifteenth aspect, an embodiment of the present disclosure provides a core network device. The core network device is a fourth core network device and may include a processor, a memory, and a transceiver, the memory is configured to store an instruction, and the processor is configured to invoke the instruction stored in the memory, to perform the following operations:

receiving, by using the transceiver, a session establishment request sent by a third core network device, where the third core network device is configured to execute a common control plane function of a core network, and the fourth core network device is configured to execute a user plane function and a session management function of the core network;

sending, by using the transceiver, a second request to a first radio access network device and/or a third request to a second radio access network device, where the second request includes related information used to instruct the first radio access network device to establish a user plane session connection to the fourth core network device, and the third request includes related information used to instruct the second radio access network device to establish a user plane session connection to the fourth core network device; and sending, by using the transceiver, a session establishment request feedback to the third core network device in response to the session establishment request, where the session establishment request feedback includes session identifiers of at least two user plane session connections, and the session identifier is used to indicate a session connection established between the first radio access network device and the fourth core network device and/or the session identifier is used to indicate a session connection established between the second radio access network device and the fourth core network device.

Optionally, before the processor sends, by using the transceiver, the session establishment request feedback to the third core network device in response to the session establishment request, if the processor further sends the second request to the first radio access network device by using the transceiver, the fourth core network device receives a second request feedback that is sent by the first radio access network device in response to the second request, where the second request feedback includes session status information used to indicate whether the user plane session connection between the first radio access network device and the fourth core network device is successfully established; and if the processor sends the third request to the second radio access network device by using the transceiver, the fourth core network device receives, by using the transceiver, a third request feedback that is sent by the first radio access network device in response to the third request, where the third request feedback includes session status information used to indicate whether the user plane session connection between the second radio access network device and the fourth core network device is successfully established.

According to a sixteenth aspect, an embodiment of the present disclosure provides a terminal device. The terminal device may include a processor, a memory, and a transceiver, the memory is configured to store an instruction, and the processor is configured to invoke the instruction stored in the memory, to perform the following operations:

sending an initial attach request to a first radio access network device by using the transceiver; and receiving, by using the transceiver, session configuration information sent by the first radio access network device, where the session configuration information is sent after the first radio access network device receives an initial attach request feedback that is sent by a first core network device in response to the initial attach request, the session configuration information includes session identifiers of at least two user plane session connections, the session identifier is used to indicate a session connection established between the first radio access network device and a fourth core network device and/or the session identifier is used to indicate a session connection established between a second radio access network device and the fourth core network device, a third core network device is configured to execute a common control plane function of a core network, and the fourth core network device is configured to execute a user plane function and a session management function of the core network.

According to a seventeenth aspect, the present disclosure provides a radio access network device. The radio access network device is a first radio access network device and includes modules or units for performing the session connection establishment method described in any one of the first aspect or the implementations of the first aspect.

According to an eighteenth aspect, the present disclosure provides a terminal device. The terminal device includes modules or units for performing the session connection establishment method described in any one of the second aspect or the implementations of the second aspect.

According to a nineteenth aspect, the present disclosure provides a core network device. The core network device is a first core network device and includes modules or units for performing the session connection establishment method described in any one of the third aspect or the implementations of the third aspect.

According to a twentieth aspect, the present disclosure provides a radio access network device. The radio access network device is a first radio access network device and includes modules or units for performing the session connection establishment method described in any one of the fourth aspect or the implementations of the fourth aspect.

According to a twenty-first aspect, the present disclosure provides a radio access network device. The radio access network device is a second radio access network device and includes modules or units for performing the session connection establishment method described in any one of the fifth aspect or the implementations of the fifth aspect.

According to a twenty-second aspect, the present disclosure provides a core network device. The core network device is a third core network device and includes modules or units for performing the session connection establishment method described in any one of the sixth aspect or the implementations of the sixth aspect.

According to a twenty-third aspect, the present disclosure provides a core network device. The core network device is a fourth core network device and includes modules or units for performing the session connection establishment method described in any one of the seventh aspect or the implementations of the seventh aspect.

According to a twenty-fourth aspect, the present disclosure provides a terminal device. The terminal device includes modules or units for performing the session connection establishment method described in any one of the eighth aspect or the implementations of the eighth aspect.

According to a twenty-fifth aspect, the present disclosure provides a communications system, including a terminal device, a first radio access network device, a second radio access network device, a first core network device, and a second core network device. The first radio access network device is the radio access network device described in the ninth aspect, the terminal device is the terminal device described in the tenth aspect, and the first core network device is the core network device described in the eleventh aspect.

According to a twenty-sixth aspect, the present disclosure provides a communications system, including a terminal device, a first radio access network device, a second radio access network device, a third core network device, and a fourth core network device. The first radio access network device is the radio access network device described in the twelfth aspect, the second radio access network device is the radio access network device described in the thirteenth aspect, the third core network device is the core network device described in the fourteenth aspect, the fourth core network device is the core network device described in the fifteenth aspect, and the terminal device is the terminal device described in the sixteenth aspect.

Implementation of the embodiments of the present disclosure brings the following beneficial effects:

In the embodiments of the present disclosure, a plurality of user plane session connections are established for the terminal device in an initial attach procedure of the terminal device, so that when performing different data services, the terminal device can select, based on QoS requirements of the different services, user plane session connections corresponding to different second core network devices (based on different network slices), to meet different communication requirements of the different data services and finally improve data service transmission quality and efficiency.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and persons of ordinary skill in the art may derive other drawings from these accompanying drawings without creative efforts.

FIG. 3b-1 and FIG. 3b-2 are a schematic flowchart of another embodiment of another session connection establishment method according to an embodiment of the present disclosure;

DESCRIPTION OF EMBODIMENTS

Figure 1:
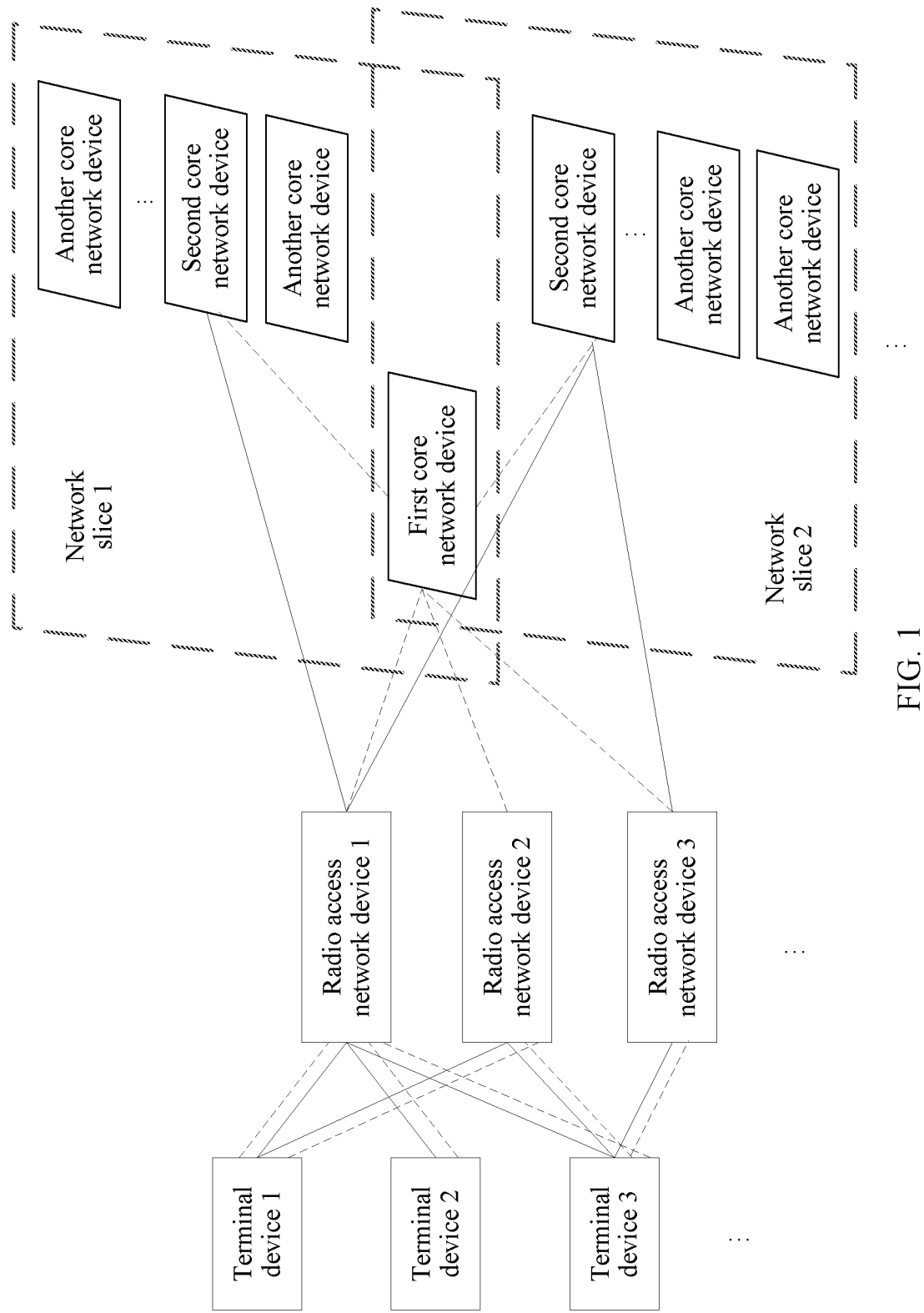
FIG. 1 is a schematic architectural diagram of a session connection establishment system according to an embodiment of the present disclosure.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

In the specification, claims, and accompanying drawings of the present disclosure, the terms "first", "second", "third", "fourth", and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The "embodiment" mentioned in the specification means that a particular characteristic, structure, or feature described with reference to the embodiment may be included in at least one embodiment of the present disclosure. The phrase shown in various locations in the specification may not necessarily refer to a same embodiment, and is not an independent or optional embodiment exclusive from another embodiment. It is explicitly and implicitly understood by persons skilled in the art that the embodiments described in the specification may be combined with another embodiment.

In the following, some terms in this application are described, to help understanding of persons skilled in the art.

(1) A terminal device may be various forms of user equipment (UE), for example, an access terminal, a terminal device, a subscriber unit, a subscriber station, a mobile station, a mobile console, a remote station, a remote terminal, a mobile device, a user terminal, a terminal, a wireless communications device, a user agent or a user apparatus, a cellular phone, a cordless telephone set, a smartphone, a Session Initiation Protocol (SIP) phone, a wireless local loop (WLL) station, a smart band, a smart wearable device, an MP3 (Moving Picture Experts Group Audio Layer III) player, an MP4 (Moving Picture Experts Group Audio Layer IV) player, a personal digital assistant (PDA), a handheld device having a wireless communication function, a computing device or another processing device connected to a wireless modem, an in-vehicle device, and a terminal device in a future 5G network.

(2) A radio access network (RAN) device may be a base transceiver station (BTS) in a 2G (such as Global System for Mobile Communications (GSM) or Code Division Multiple Access (CDMA)) system, or may be a NodeB (NB) in a 3G (such as Universal Mobile Telecommunications System (UMTS), Wideband Code Division Multiple Access (WCDMA), or Time Division-Synchronous Code Division Multiple Access (TD-SCDMA)) system, or may be an evolved NodeB (eNB) in a Long Term Evolution (LTE) system, or may be a radio access network device in the future 5G network.

(3) "A plurality of" means two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

The following describes the embodiments of this application with reference to accompanying drawings.

For ease of understanding the embodiments of the present disclosure, the following first describes an architecture of a session connection establishment system. The embodiments of the present disclosure are based on this architecture. FIG. 1 is a schematic architectural diagram of a session connection establishment system according to an embodiment of the present disclosure. Referring to FIG. 1, the system includes a terminal device, a radio access network device, a first core network (CN) device, a second core network device, and another core network device. The terminal device may access, by using one or more radio access network devices, a network slice that includes the first core network device, the second core network device, and the another core network device. It may be seen from FIG. 1 that, in this embodiment of the present disclosure, one terminal device may access one or more (including one or two in FIG. 1) network slices by using one or more (including one, two, or three in FIG. 1) radio access network devices. It should be noted that, each network slice may be considered as a logical core network that includes a data function set and a control function set. Different network slices may specially serve a type of data service. For example, a service with a large data volume and a low latency may select a network slice with large storage space and a low latency, and a service with a small data volume may select a network slice with small storage space. In other words, different network slices may provide corresponding core network services in different application scenarios. In FIG. 1, a solid line "——" represents a user plane connection, and a dashed line "- - -" represents a control plane connection. Because the radio access network device has an access network control plane function and an access network user plane function, there is a user plane connection and a control plane connection between the terminal device and the radio access network device. There is a control plane connection between the radio access network device and the first core network device, and there is a user plane connection between the radio access network device and the second core network device. The first core network device and the second core network device may be connected to each other by using a control plane or through an interface. Specifically, the first core network device may be configured to execute a common control plane function, and the second core network device is configured to execute a user plane function. The another core network device in FIG. 1 may be configured to execute only the user plane function like the second core network device, and is not selected to establish a session connection to the radio access network device in this embodiment of the present disclosure. For example, the first core network device is a mobility management entity (MME), and the second core network device is a serving gateway (SGW).

In the embodiments of the present disclosure, all network slices may share the first core network device, and the first core network device can provide functions such as session management, mobility management, user authentication, service authorization, and quality of service control. Each network slice may include a plurality of core network devices and the second core network device. The second core network device is not a specific core network device, but is a type of core network device that is selected by the first core network device from each network slice and that needs to establish a user plane session connection to a first radio access network device or a second radio access network device in the embodiments of the present disclosure. There may be one or more second core network devices. The second core network device sends user data of the terminal device to another device, and may further send data of the another device to the terminal device. Functions of the second core network device include but are not limited to data packet routing, filtering, forwarding, and the like. The another device includes but is not limited to a server or a packet data network (PDN). Functions of the radio access network device include but are not limited to mobility management on the terminal device, call processing, link management, security encryption, header compression, scheduling, encoding, modulation, demodulation, retransmission, segmentation, convergence, a radio frequency function, and the like.

Figure 2A:
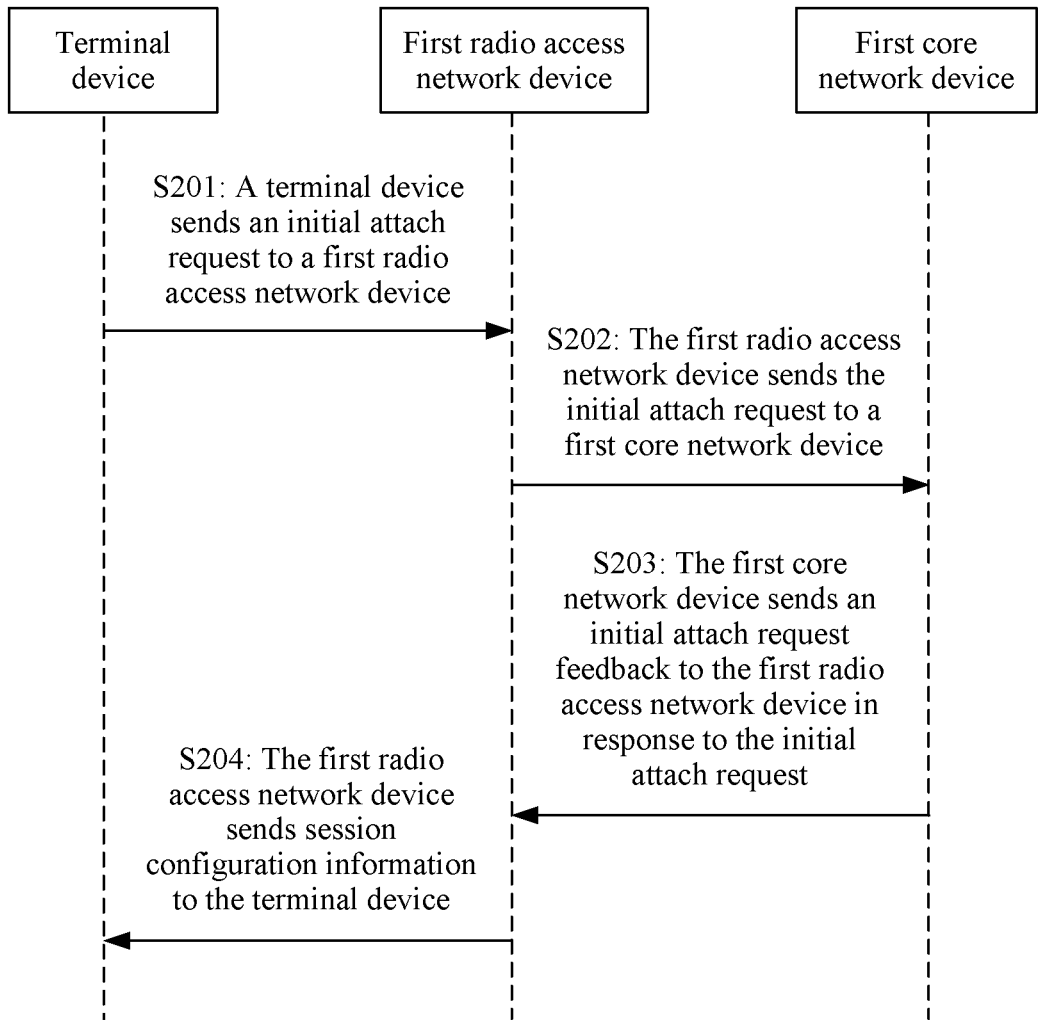
FIG. 2a is a schematic flowchart of a session connection establishment method according to an embodiment of the present disclosure.

FIG. 2a is a schematic flowchart of a session connection establishment method according to an embodiment of the present disclosure. With reference to FIG. 2a, the following describes in detail the session connection establishment method in this embodiment of the present disclosure from the perspective of interaction between a terminal device, a first radio access network device, and a first core network device. The method may include the following steps S201 to S204.

Step S201: The terminal device sends an initial attach request to the first radio access network device, and the first radio access network device receives the initial attach request sent by the terminal device.

Specifically, in the prior art, after the initial attach request of the terminal device is received, a related core network device may establish only one user plane session connection for the terminal device. Therefore, when the terminal device needs to perform a plurality of types of data services, user plane session connections, or session connections for short, of other services are successively established only after initial attachment is completed. In this embodiment of the present disclosure, after the initial attach request of the terminal device is received, a plurality of user plane session connections are established for the terminal device. In this way, the terminal device does not need to take a relatively long time to establish corresponding session connections when performing the plurality of data services, and a problem is avoided that communication efficiency is low when the terminal device may use a same type of session connection for services of different QoS requirements. Further, in this embodiment of the present disclosure, session connections to different second core network devices may be established by using different access network devices, and the different second core network devices may be based on different network slices. In this way, session connections that can meet various QoS requirements can be established.

In a possible implementation, the initial attach request may include a first initial attach request and a second initial attach request in two cases in which a session connection is determined for the terminal device on the first core network device side and a session connection is determined for the terminal device on the terminal device side.

The first initial attach request includes at least one of channel state information between the terminal device and the first radio access network device, channel state information between the terminal device and a second radio access network device, and an identifier of the second radio access network device. The first core network device is unclear about a specific radio access network device that can be accessed by the terminal device. Therefore, the identifier of the second radio access network device is included, that is, the terminal device can directly add, to the initial attach request, the identifier of the second radio access network device that can be accessed by the terminal device, to notify the first core network device that a subsequent user plane session connection may be specifically established between which radio access network device and a core network device. The second radio access network device may be a type of device, and there may be one or more second radio access network devices. The terminal device may determine, based on a related signal strength parameter or the like in a measurement report, a specific radio access network device that can be accessed by the terminal device. The channel state information between the terminal device and the first radio access network device is included, so that the first core network device can adjust, based on the channel state information, a quantity of user plane session connections corresponding to the first radio access network device, and the like. This is not specifically limited in this embodiment of the present disclosure. Likewise, the channel state information between the terminal device and the second radio access network device is included, so that the first core network device can determine, based on the channel state information, whether to establish a user plane session connection between the second radio access network device and a core network device for the terminal device, and a specific quantity of user plane session connections that can be established. Apparently, when the channel state information between the terminal device and the first radio access network device and the channel state information between the terminal device and the second radio access network device are included, the first core network device may be instructed to adjust, based on the two pieces of information, a quantity of user plane session connections corresponding to the first radio access network device, a quantity of user plane session connections corresponding to the second radio access network device, and the like. This is not specifically limited in this embodiment of the present disclosure. It can be understood that beneficial effects of other combinations of the foregoing three pieces of information are not described in detail in the present disclosure.

The second initial attach request includes preset service identifiers respectively corresponding to at least two preset services of the terminal device and includes at least one of the following: network slice identifiers respectively corresponding to the at least two preset services, an identifier of the first radio access network device, and the identifier of the second radio access network device, and the network slice identifier is used by the first core network device to select the second core network device from a corresponding network slice based on the network slice identifier. The second initial attach request needs to include the preset service identifier, so that the first core network device can learn of, based on the preset service identifier, a service type that needs to be established by the terminal device, for example, an evolved massive broadband (eMBB) service or a machine type communication (MTC) service, and determine, based on a current network status and the preset service identifier, whether the terminal device is authorized to access a service of this type. Finally, the first core network device selects, based on a corresponding preset service identifier and according to a specific rule, a proper core network device from one or more network slices as the second core network device that needs to establish a session connection. If the initial attach request includes the identifier of the first radio access network device, the identifier of the first radio access network device is used to notify the first core network device that the terminal device determines that a session connection needs to be established by using the first radio access network device. If the initial attach request includes the identifier of the second radio access network device, the identifier of the second radio access network device may be used to notify the first core network device that the terminal device can access the second radio access network device, or needs to establish a session connection to the second radio access network device. If the initial attach request includes the at least two network slice identifiers corresponding to the at least two preset services, the first core network device may directly select, based on the network slice identifiers from network slices corresponding to the network slice identifiers, the second core network device that finally needs to establish a session connection to the terminal device. It can be understood that beneficial effects of other combinations of the foregoing plurality of pieces of information are not described in detail in the present disclosure.

In a possible implementation, the first initial attach request information further includes network slice capability information of the terminal device, and the network slice capability information is used to indicate a quantity of network slices that can be accessed by the terminal device and/or a network slice that can be accessed by the terminal device. Because the second core network device in this embodiment of the present disclosure is a core network device that is finally selected by the first core network device to establish a session connection to a radio access network device, there may be a same second core network device or different second core network devices, and the different second core network devices may belong to different network slices. The radio access network device includes the first radio access network device and/or the second radio access network device, and a core network device is a core network device that has a user plane function. Therefore, the terminal device may add the network slice capability information to the first initial attach request, for example, the quantity of network slices and the network slice supported by the terminal device, so that the first core network device allocates a proper network slice to the terminal device based on the information, and further selects a proper second core network device from the proper network slice.

For example, if the network slice capability information of the terminal device includes information indicating that the terminal device can support a network slice of an MTC service with a very low latency/a small data packet, and both a core network device and the terminal device may access a radio access network device that supports the network slice of the MTC service with a very low latency/a small data packet, the first core network device may establish a session with a very low latency for the terminal device. It should be noted that, if MTC services with a very low latency and a small data packet belong to a same network slice, the first core network device may instruct to simultaneously establish a session with a very low latency and an MTC service session with a small data packet for the terminal device on different second core network devices in the single network slice.

Step S202: The first radio access network device sends the initial attach request to the first core network device, and the first core network device receives the initial attach request sent by the first radio access network device.

Specifically, in a system architecture on which this embodiment of the present disclosure is based, a session management function is executed by the first core network device that executes a common control plane of a core network. Therefore, the first radio access network device sends the initial attach request to the first core network device, and the first core network device allocates a session connection to the first radio access network device and establishes the corresponding session connection. In addition, because the first core network device is a common control plane core network device shared by all network slices, each terminal device finally forwards the initial attach request to the first core network device regardless of which radio access network device is used for access, to finally obtain an allocated session connection.

In a possible implementation, after receiving the initial attach request, the first core network device may further perform security verification and authentication with the terminal device, to ensure security of subsequent communication between the terminal device and the first core network device.

Step S203: The first core network device sends an initial attach request feedback to the first radio access network device in response to the initial attach request, and the first radio access network device receives the initial attach request feedback that is sent by the first core network device in response to the initial attach request.

Specifically, the initial attach request feedback includes session identifiers of at least two user plane session connections, and the session identifier is used to indicate a session connection established between the first radio access network device and the second core network device and/or the session identifier is used to indicate a session connection established between the second radio access network device and the second core network device.

In a possible implementation, the initial attach request feedback further includes an identifier that is of a radio access network device establishing a session connection to the second core network device and that is corresponding to each of the at least two user plane session connections. The session configuration information further includes the identifier of the radio access network device. Because a session identifier in this embodiment of the present disclosure is mainly a session type, that is, a parameter related to a bearer type, the attach request feedback further needs to include a corresponding radio access network device identifier. In this case, when the terminal device needs to send a related data service, the terminal device may learn of a specific device that is corresponding to the radio access network device identifier and to which the terminal device needs to initiate a session.

In this embodiment of the present disclosure, corresponding to the descriptions in step S201, the session identifiers of the at least two user plane session connections include the following two cases.

Case 1: The first core network device determines a parameter related to user plane session establishment. Specifically, the first core network device actively establishes the at least two user plane session connections for the terminal device based on the received initial attach request, in other words, establishes several user plane session connections, and the core network device determines a specific radio access network device and a specific core network device between which each user plane session connection is established. The core network device may perform the determining based on some related information of the terminal device stored in the core network device and the initial attach request sent by the terminal.

Case 2: The terminal device determines a parameter related to user plane session establishment. Initially, the terminal device pre-selects, based on a parameter in a cell measurement report obtained by the terminal device and data of a service that currently or subsequently needs to be performed, a specific radio access network device and a specific corresponding core network device for establishing a user plane session required by the terminal device.

However, regardless of a manner of determining user plane session establishment, the user plane session establishment needs to be finally determined by a related core network device. If the terminal device determines a related parameter, the core network device may further need to finally determine, based on a service type in the parameter information such as enhanced mobile broadband (EMBB) or machine type communication (MTC), a current network status, whether a user is authorized to access the service, and the like, a session connection to be established for the terminal device. A plurality of different sessions may be established between different access network devices and different core network devices or may be established between a same access network device and a same core network device. When different sessions are established to different access network devices, selection and matching may be performed based on network quality, a service priority, and the like. That is, the first core network device finally feeds back the identifiers of the determined at least two user plane session connections to the first radio access network device. It can be understood that, the first radio access network device in this embodiment of the present disclosure is a radio access network device on which the terminal device currently camps, and the second radio access network device is a radio access network device that the terminal device can currently access but may possibly access later, that is, a secondary radio access network device.

For example, the first radio access network device is a base station in 4G, and may provide a stable access and camping function for a terminal device of a user, and the second radio access network device is a radio access network device in 5G, and may provide a high-speed data service for the user. Because 4G and 5G may coexist in a long period of time in the future, the terminal device may simultaneously establish a plurality of user plane session connections to a core network device by using a plurality of access network devices in this embodiment of the present disclosure, to simultaneously process different types of services (having different latency requirements, different QoS requirements, or the like) to finally meet various requirements of different services.

Step S204: The first radio access network device sends session configuration information to the terminal device, where the session configuration information includes session identifiers of at least two user plane session connections; and the terminal device receives the session configuration information sent by the first radio access network device.

Specifically, the first radio access network device finally sends the session configuration information to the terminal device based on the received initial attach request feedback, and the session configuration information includes the session identifiers of the at least two user plane session connections established by the first core network device for the terminal device. Therefore, the terminal device may send related service data to a corresponding radio access network device when the terminal device needs to perform a corresponding data service based on the session identifier. Then the terminal device performs efficient communication transmission by using an established user plane session connection. After receiving the session configuration information, the terminal device performs data session transmission on the at least two user plane session connections based on the session identifier in the session configuration information and an identifier of a radio access network device that needs to be accessed on a session connection corresponding to the session identifier, and a first radio access network and/or a second radio access network allocate/allocates, to a user, unique identifiers (a first identifier and a second identifier) within coverage areas of the first radio access network and/or the second radio access network. That is, the terminal device finally needs to perform session transmission between a radio access network device and a corresponding second core network device based on a session connection allocated and established by the first core network device for the terminal device, to finally meet various QoS requirements of data services of the terminal.

In a possible implementation, when the session identifier is used to indicate the session connection established between the second radio access network device and the first core network device, or when the session identifier is used to indicate the session connection established between the first radio access network device and the second core network device and is used to indicate the session connection established between the second radio access network device and the second core network device, the first radio access network device further needs to forward, to the second radio access network device, information related to a session connection that needs to be established for the terminal device.

In a possible implementation, the session configuration information further includes session status information, the session status identifier information is used to indicate a session status of a session connection corresponding to the session identifier, and the session status includes a radio resource connection RRC connected mode, an RRC idle mode, and a third RRC mode. The third RRC mode is a mode other than the RRC connected mode and the RRC idle mode. In the prior art, even if a plurality of session connections are established for the terminal device (which may be established during non-initial attachment and need to be successively established), because these session connections are established between a same radio access network device and a core network device, all different session connections are actually in a same RRC mode. However, in this case, many services that have different latency requirements are forced to be in a same RRC mode, and consequently, a plurality of data services cannot achieve maximum efficiency simultaneously. Therefore, in this embodiment of the present disclosure, not only a plurality of user plane session connections can be established for the terminal during initial attachment of the terminal, but also the different session connections can be in different RRC modes, that is, different radio access network devices or different core network devices may enable the terminal device to be in different RRC modes, to meet RRC mode requirements for different services and improve communication efficiency.

Figure 2B:
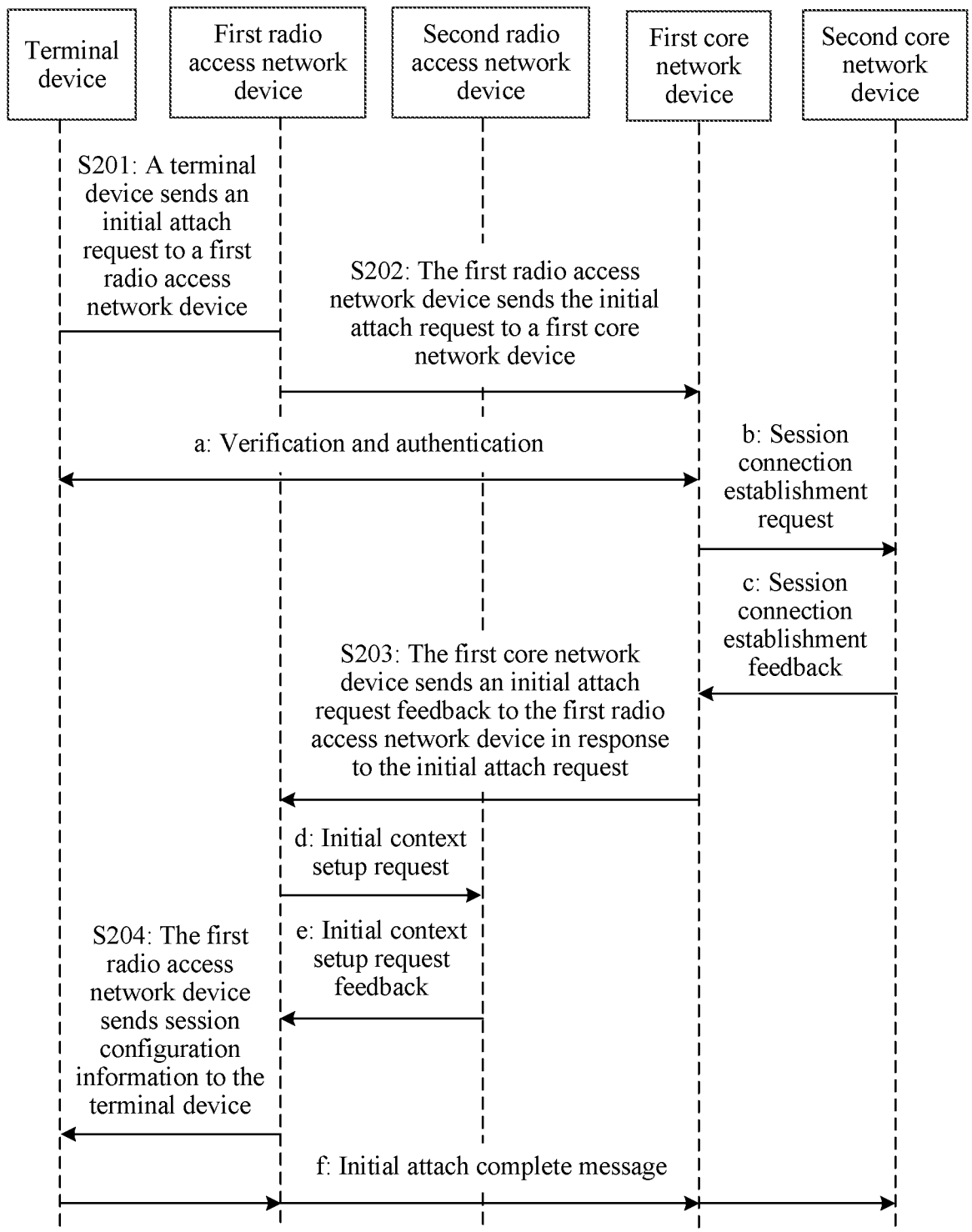
FIG. 2b is a schematic flowchart of another embodiment of a session connection establishment method according to an embodiment of the present disclosure.

It can be understood that, although actions performed by the second radio access network device and the second core network device are not described in detail in the foregoing embodiment of the present disclosure, it does not indicate that the actions performed by the second radio access network device and the second core network device are not involved in the foregoing embodiment. FIG. 2b is a schematic flowchart of another embodiment of a session connection establishment method according to an embodiment of the present disclosure. In FIG. 2b, in addition to step S201 to step S204 described in the foregoing embodiment, this embodiment of the present disclosure includes a: Verification and authentication in FIG. 2b. That is, after receiving the initial attach request of the terminal sent by the first radio access network device, the first core network device needs to perform a series of verification and authentication processes with the terminal device, to verify and ensure communication security of the terminal device. In addition, if the at least two user plane session connections of the terminal device include the session connection between the second radio access network device and the second core network device, this embodiment of the present disclosure may include b: Session connection establishment request and c: Session connection establishment feedback in FIG. 2b. That is, an initial context setup request, an initial context setup request feedback, and the like need to be exchanged between the first radio access network device and the second radio access network device, so that the first radio access network device notifies the second radio access network device of a session connection that needs to be established for the terminal device and session establishment related information. The initial context setup request and the initial context setup request feedback may be equivalent to a first request and a first request feedback in the following embodiment corresponding to FIG. 3a. Certainly, after completing initial attachment, the terminal device may also notify the first radio access network device on which the terminal currently camps, and finally notify the first core network device and the second core network device. It can be understood that, this embodiment of the present disclosure may further include other necessary interaction procedures, and the procedures are not enumerated herein.

In this embodiment of the present disclosure, a plurality of user plane session connections are established for the terminal device in an initial attach procedure of the terminal device, so that when performing different data services, the terminal device can select, based on QoS requirements of the different services, user plane session connections corresponding to different second core network devices that are based on different network slices, to meet different communication requirements of the different data services and finally improve data service transmission quality and efficiency.

Figure 3A:
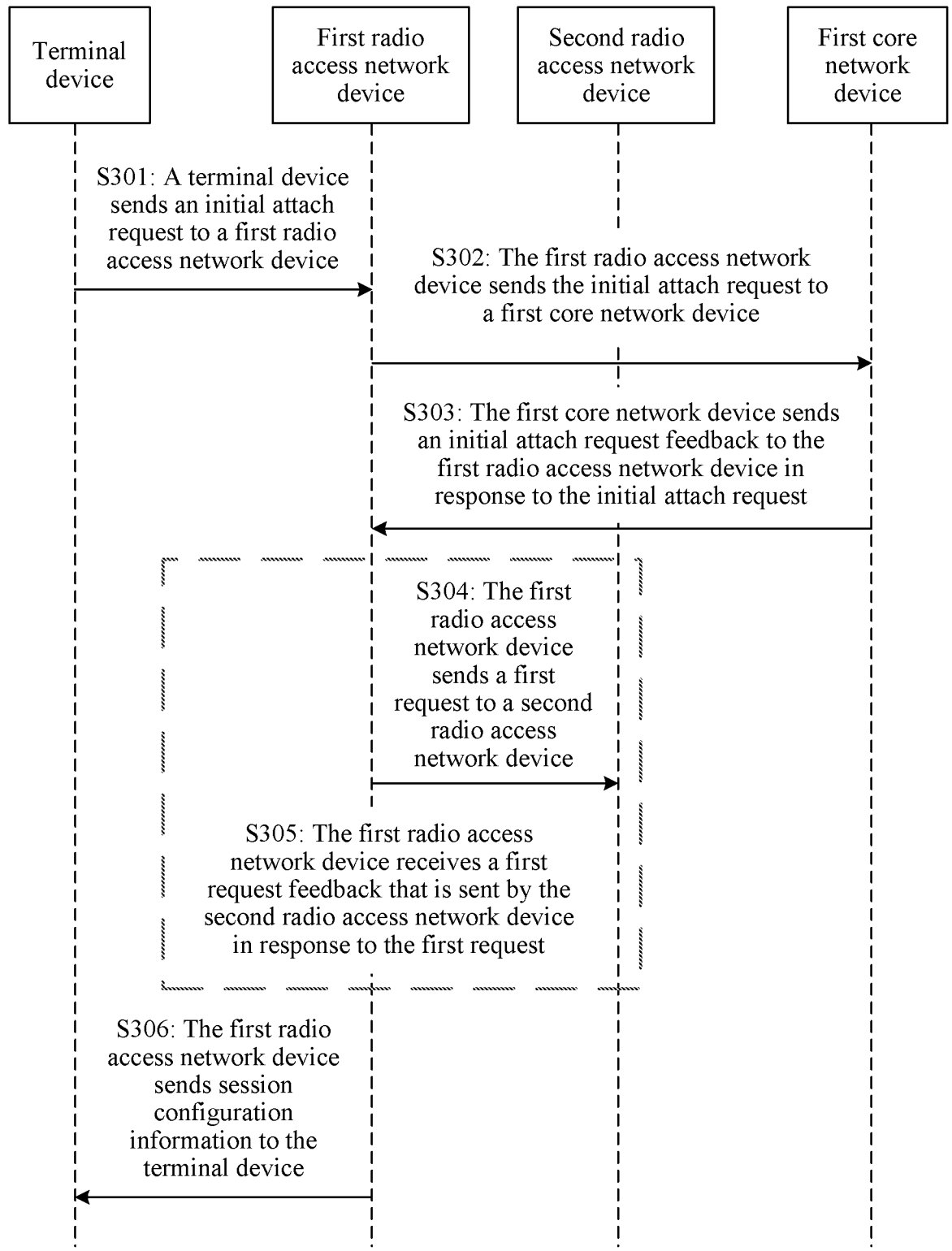
FIG. 3a is a schematic flowchart of another session connection establishment method according to an embodiment of the present disclosure.

FIG. 3a is a schematic flowchart of another session connection establishment method according to an embodiment of the present disclosure. With reference to FIG. 3a, the following describes in detail the session connection establishment method in this embodiment of the present disclosure from the perspective of interaction between a terminal device, a first radio access network device, a second radio access network device, and a first core network device. Steps in the method procedure corresponding to FIG. 3a are basically the same as those in the method procedure corresponding to FIG. 2a, and step S304 and step S305 in a dashed-line block are added. That is, when a session connection to the second radio access network device needs to be established, before sending session configuration information to the terminal device, the first radio access network device needs to send session connection establishment related information to the second radio access network device. The method may include the following steps S301 to S306.

For step S301 to step S303, refer to step S201 to step S203 in the foregoing embodiment in FIG. 2a. Details are not described herein again.

Step S304: The first radio access network device further sends a first request to the second radio access network device.

Specifically, the first request is mainly used to notify the second radio access network device of a specific session connection that needs to be established for the terminal device. Specifically, the first request may be an initial context setup request of the terminal device. Specifically, the first request may include at least one of the following: a first identifier of the terminal device, at least one of session identifiers of at least two user plane session connections, and an identifier of the second core network device. The first identifier is used to uniquely identify the terminal device within a control range of the first radio access network device. The first identifier may be an identifier allocated by the first core network device to the terminal device, or may be an international mobile subscriber identity (IMSI), or may be another identifier. The session identifier is included, so that the second radio access network device can learn a type of a session connection that the second radio access network device needs to establish for the terminal device. The identifier of the second core network device is included, so that the second radio access network device learns of a specific second core network device with which a session is established.

Step S305: The first radio access network device receives a first request feedback that is sent by the second radio access network device in response to the first request.

Specifically, the first request feedback is mainly used to notify the first radio access network device of a specific session connection currently established by the second radio access network device for the terminal device and a specific core network device to which the session connection is established, so that the first radio access network device notifies the terminal device. Specifically, the first request feedback may be an initial context setup request feedback of the terminal device. Specifically, the first request feedback includes at least one of establishment status information of at least one user plane session connection, an identifier of the second radio access network device, a session identifier of a session connection that is in the user plane session connection and that has been successfully established in the second radio access network device, and a second identifier allocated by the second radio access network device to the terminal device, where the second identifier is used to uniquely identify the terminal device within a coverage area of the second radio access network device. The second identifier may be allocated by the second radio access network device to the terminal device, to uniquely identify the terminal device within the coverage area of the second radio access network device, so as to facilitate subsequent paging on the terminal device or communication with the terminal device. The identifier of the second radio access network device is included to notify the first radio access network device of a specific radio access network device from which the first request feedback is sent.

For step S306, refer to step S204 in the foregoing embodiment in FIG. 2a. Details are not described herein again.

Figures 1, 3B:
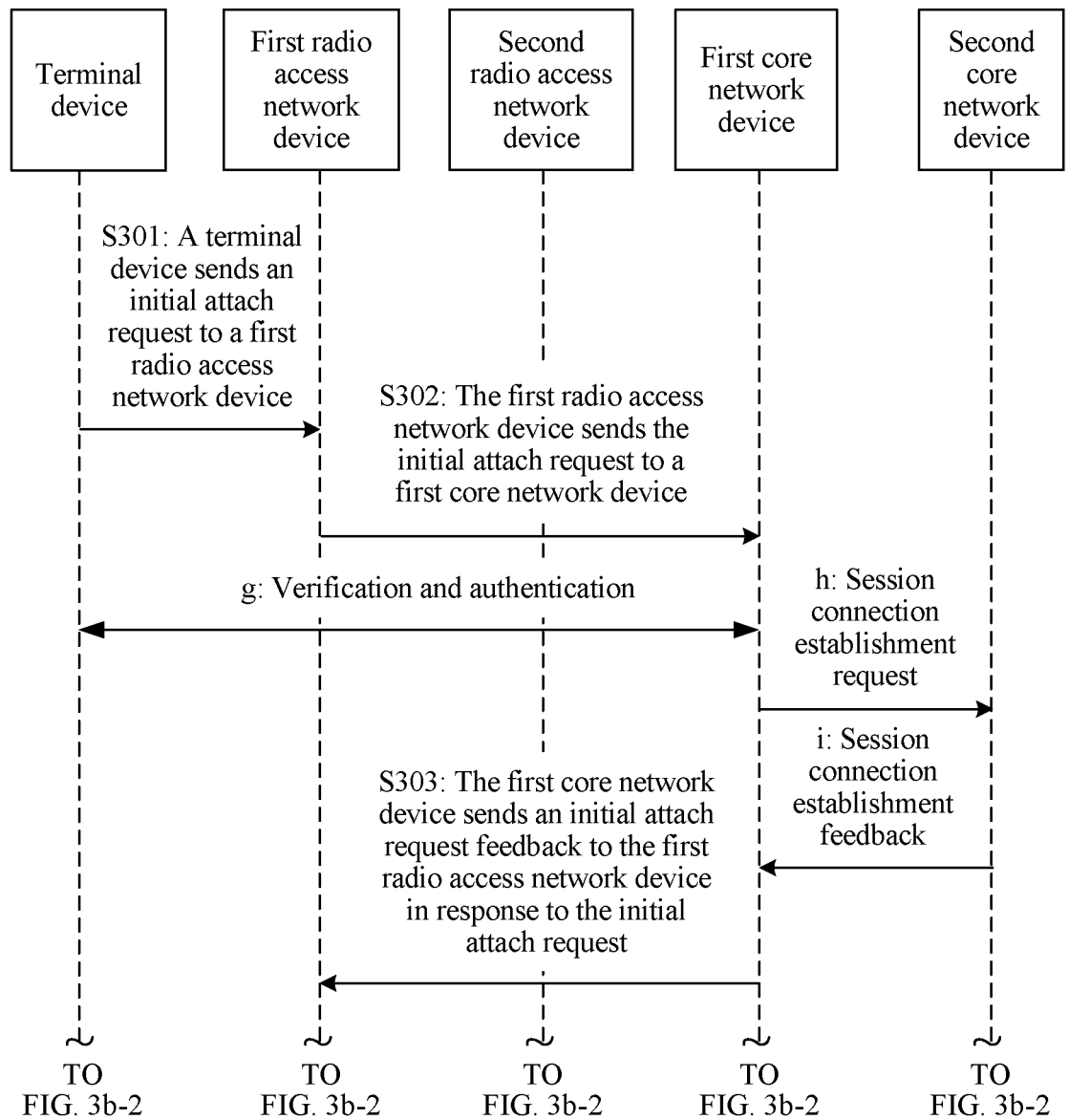
Figures 2, 3B:
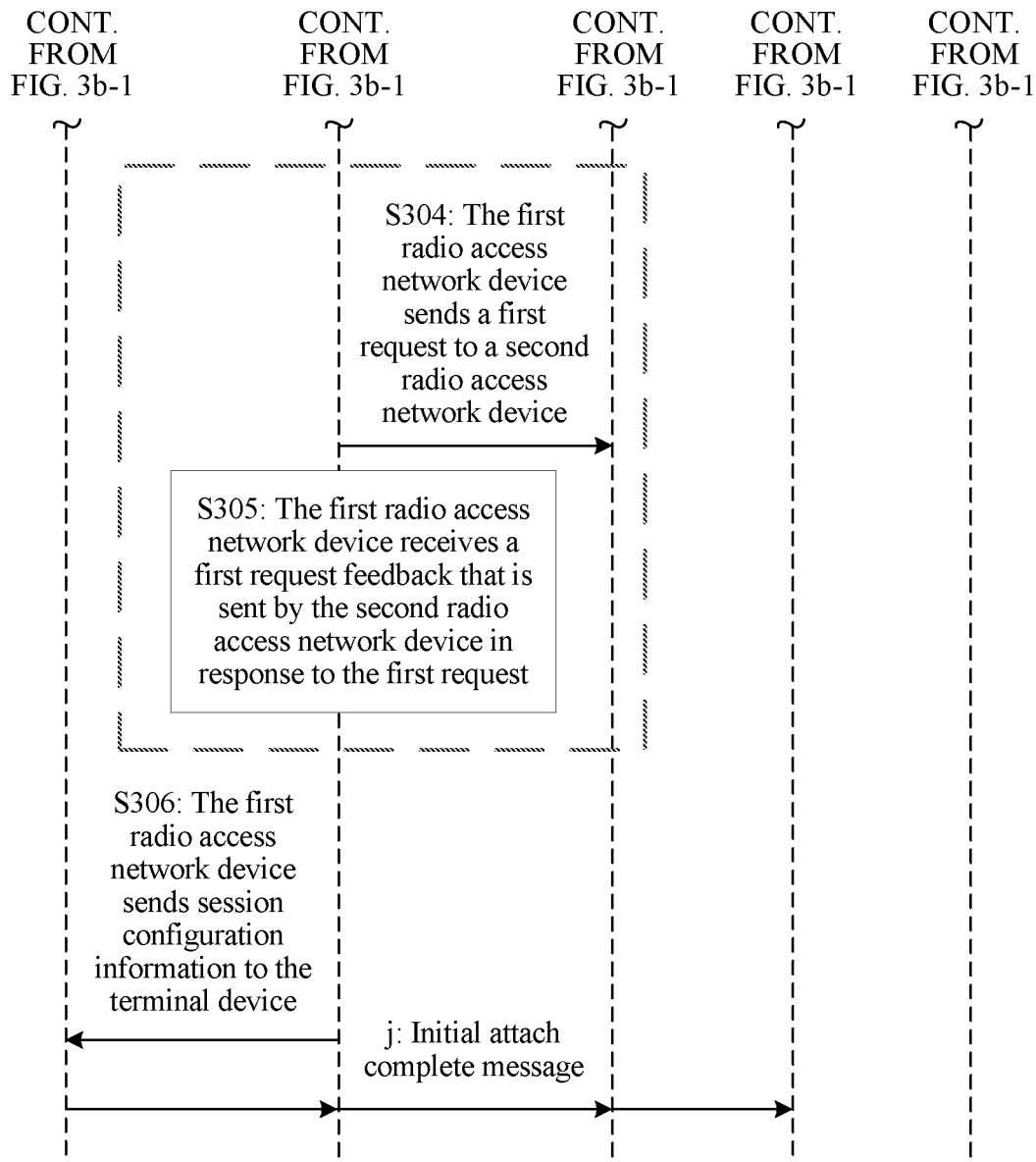

It can be understood that, although actions performed by the second radio access network device and the second core network device are not described in detail in the foregoing embodiment of the present disclosure, it does not indicate that the actions performed by the second radio access network device and the second core network device are not involved in the foregoing embodiment. FIG. 3b-1 and FIG. 3b-2 are a schematic flowchart of another embodiment of another session connection establishment method according to an embodiment of the present disclosure. In FIG. 3b-1 and FIG. 3b-2, in addition to step S301 to step S306 described in the foregoing embodiment, this embodiment of the present disclosure includes steps g, h, i, and j in FIG. 3b-1 and FIG. 3b-2. For detailed description, refer to the descriptions of a, b, c, and f in FIG. 2b. It can be understood that, this embodiment of the present disclosure may further include other necessary interaction procedures, and the procedures are not enumerated herein.

In this embodiment of the present disclosure, a plurality of user plane session connections are established for the terminal device in an initial attach procedure of the terminal device, so that when performing different data services, the terminal device can select, based on QoS requirements of the different services, user plane session connections corresponding to different second core network devices, to meet different communication requirements of the different data services and finally improve data service transmission quality and efficiency. It should be noted that, the second core network devices may be based on different network slices.

Figure 4:
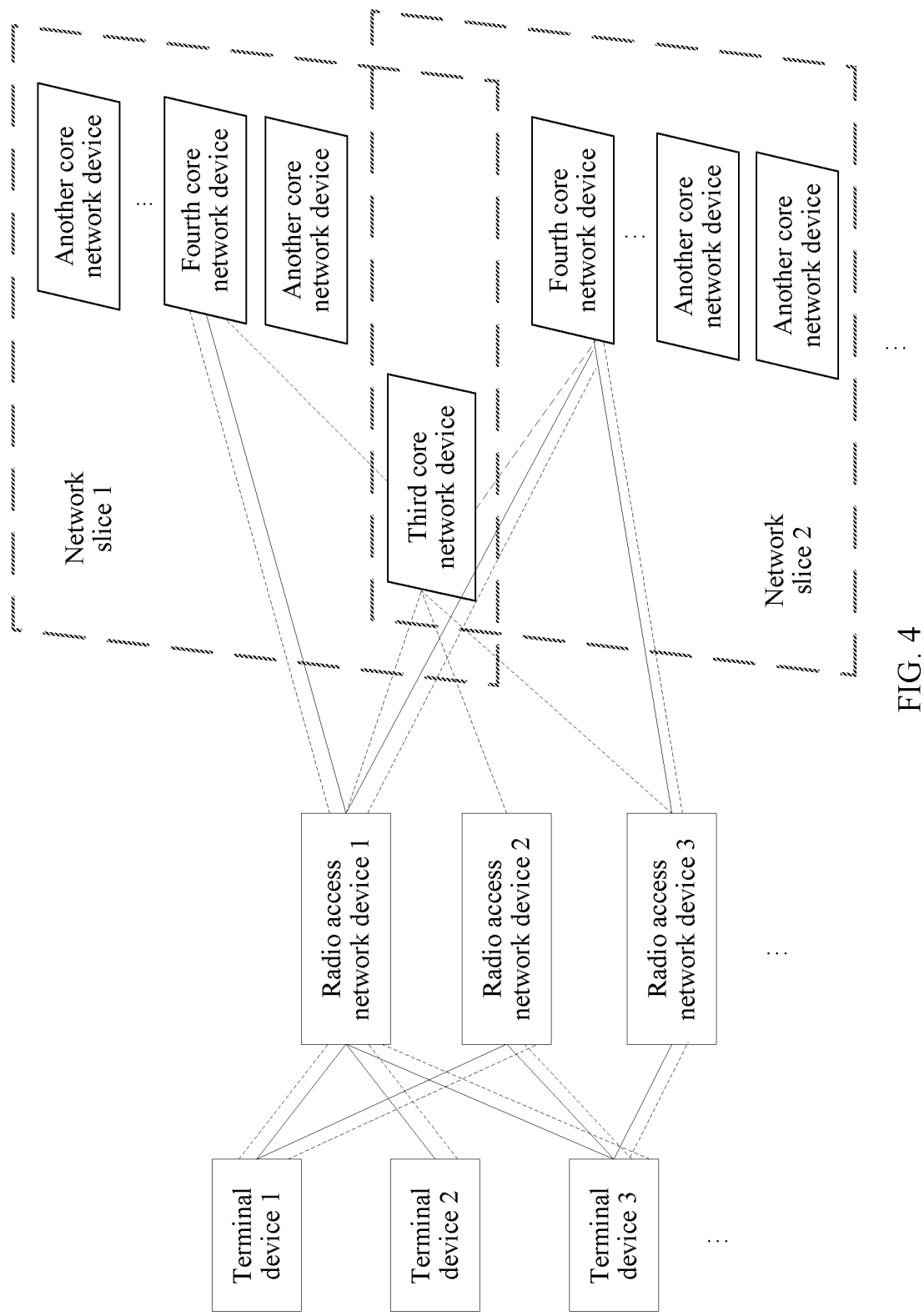
FIG. 4 is a schematic architectural diagram of another session connection establishment system according to an embodiment of the present disclosure.

The session connection establishment method in the present disclosure may alternatively be implemented based on another system architecture provided in an embodiment of the present disclosure. FIG. 4 is a schematic architectural diagram of another session connection establishment system according to an embodiment of the present disclosure. The system includes a terminal device, a radio access network device, a third core network device, a fourth core network device, and another core network device. The terminal device may access, by using one or more radio access network devices, a network slice that includes the third core network device, the fourth core network device, and the another core network device. The terminal device and the radio access network device correspond to those in FIG. 1 and have a same function as those in FIG. 1. The third core network device in FIG. 4 corresponds to the first core network device in FIG. 1, and the fourth core network device in FIG. 4 corresponds to the second core network device in FIG. 1. A difference lies in that in this system architecture, a session management function originally executed by the third core network device is executed by the fourth core network device, but is executed by the first core network device in FIG. 1. Therefore, in FIG. 4, in addition to a solid line representing a user plane connection, a dashed line corresponding to session management exists between the radio access network device and the fourth core network device, and a session management plane belongs to a control plane. In the system architecture corresponding to FIG. 4, a core network device of each user plane may plan and manage a procedure of establishing a session connection by the core network device, and this is more efficient than a manner in which the third core network device needs to perform planning and management and then instruct the fourth core network device to perform establishment. In addition, different data services are managed through different session management, and session transmission is finally performed through different user plane session connections. This can better meet various QoS requirements of different services.

Figure 5A:
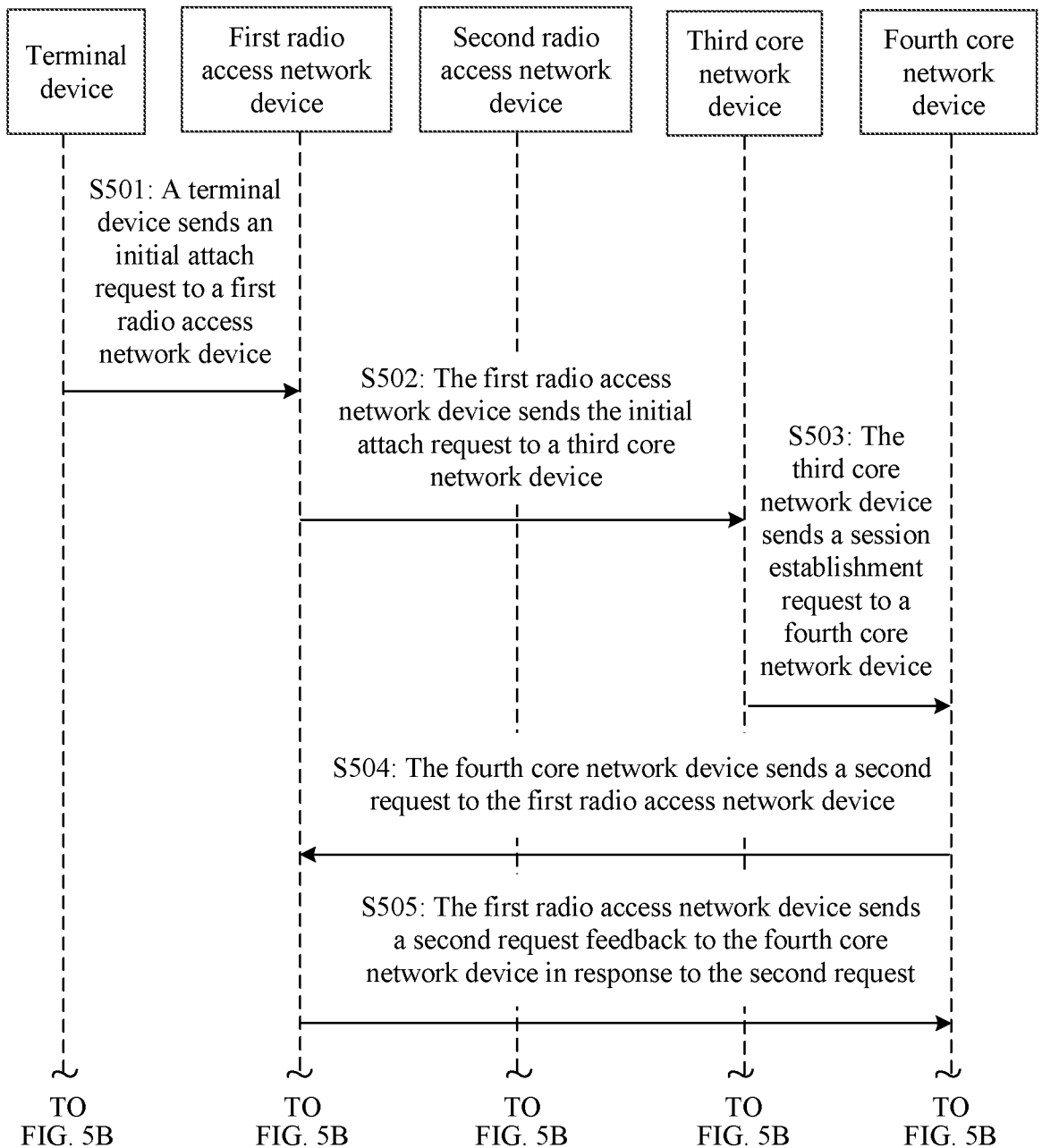
FIG. 5A and FIG. 5B are a schematic flowchart of still another session connection establishment method according to an embodiment of the present disclosure.
Figure 5B:
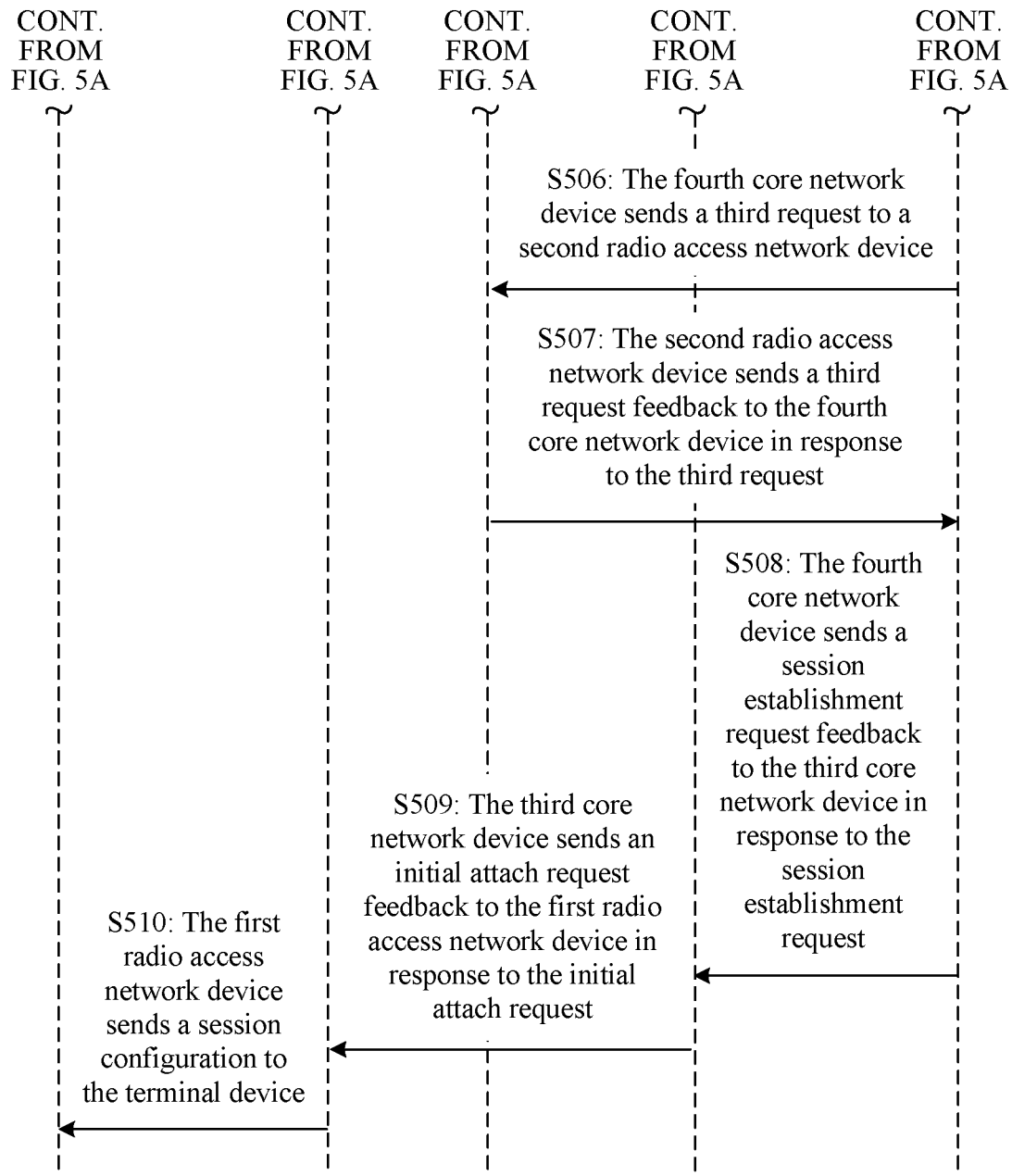

FIG. 5A and FIG. 5B are a schematic flowchart of still another session connection establishment method according to an embodiment of the present disclosure. With reference to FIG. 5A and FIG. 5B, the following describes in detail the session connection establishment method in this embodiment of the present disclosure from the perspective of interaction between a terminal device, a first radio access network device, a second radio access network device, a third core network device, and a fourth core network device. The method may include the following steps S501 to S510.

Step S501: The terminal device sends an initial attach request to the first radio access network device, and the first radio access network device receives the initial attach request sent by the terminal device.

Step S502: The first radio access network device sends the initial attach request to the third core network device, and the third core network device receives the initial attach request sent by the first radio access network device, where the third core network device is configured to execute a common control plane function of a core network.

Specifically, for step S501 and step S502, correspondingly refer to step S201 and step S202 in the embodiment provided in FIG. 2a. Specific implementations are not described herein again.

Step S503: The third core network device sends a session establishment request to the fourth core network device, and the fourth core network device receives the session establishment request sent by the third core network device, where the third core network device is configured to execute the common control plane function of the core network, and the fourth core network device is configured to execute a user plane function and a session management function of the core network.

Specifically, the third core network device is configured to execute the common control plane function of the core network (the session management function may be excluded), and the fourth core network device is configured to execute the user plane function and the session management function of the core network. Therefore, when learning of a service requirement of the terminal device by using the initial attach request sent by the terminal, the third core network device may initiate the session establishment request to the fourth core network device. The session establishment request may include an identifier of the terminal device, the first radio access network device, the second radio access network device, QoS requirement information for establishing a session, or the like, so that the fourth core network device more properly establishes a user plane session for the terminal device based on the information.

It should be emphasized that, each network slice not only includes the shared third core network device, but also includes a plurality of core network devices that are configured to execute the user plane function and the session management function. Therefore, the third core network device selects, from the plurality of core network devices according to a specific principle (for example, current communication quality, a bearer capability, and a type of a provided data service), a core network device that sends the session establishment request as the fourth core network device in this embodiment of the present disclosure. In other words, the fourth core network device is essentially a core network device in FIG. 4, but a core network device that needs to establish a session connection to the terminal device is finally referred to as the fourth core network device.

Step S504: The fourth core network device sends a second request to the first radio access network device, and the first radio access network device receives the second request sent by the fourth core network device.

Specifically, when the first radio access network device needs to establish a session connection, after receiving the session establishment request sent by the third core network device, the fourth core network device sends the second request to the first radio access network device and/or the second radio access network device. Specifically, the second request may be an initial context setup request. The second request includes related information used to instruct the first radio access network device to establish a user plane session connection to the fourth core network device, so that the first radio access network device establishes the user plane session connection to the fourth core network device. Therefore, in addition to an initial context setup request of the terminal device, the second request may carry an identifier of a network slice to which a current fourth core network device belongs, an identifier of the fourth core network device, or the like, so that the first radio access network device learns of, based on the identifier of the network slice, a type of a session that needs to be established (because identifiers of different network slices may indicate different data service types served by the network slices). In addition, the first radio access network device may also learn of, based on the identifier of the fourth core network device, a specific object that needs to establish a session and the like.

It can be understood that, this method step is performed when the first radio access network device needs to establish a session. If the first radio access network device does not need to establish a session connection in this process, the fourth core network device does not send the second request to the first radio access network device. Likewise, because the terminal device may access a plurality of radio access network devices, it is possible that a session connection needs to be established only to the second radio access network device. In this case, the first radio access network device does not need to establish a session connection. In this method step, a case in which the first radio access network device needs to establish a session connection is first discussed, and in this case, the first radio access network device receives the second request sent by the second radio access network device. In a possible implementation, when the first radio access network device does not need to establish a session connection, after the first radio access network device sends the initial attach request to the third core network device, the first radio access network device receives an initial attach request feedback that is sent by the third core network device in response to the initial attach request. The initial attach request feedback includes session identifiers of at least two user plane session connections, and the session identifier is used to indicate a session connection established between the second radio access network device and the fourth core network device. The first radio access network device sends session configuration information to the terminal device. The session configuration information includes the session identifiers of the at least two user plane session connections. That is, when the first radio access network device does not need to establish a session connection, a session connection is definitely established by using the second radio access network device (there may be one or more second radio access network devices). Therefore, in this case, the initial attach request feedback received by the first radio access network device from the third core network device includes the session identifier that is used to indicate the session connection between the second radio access network device and the fourth core network device. It should be noted that, although the first radio access network device does not need to establish a session connection in this case, the third core network device still needs to notify the first radio access network device of session connection information of the terminal device, because the first radio access network device is a radio access network device on which the terminal device camps (this may be learned from a fact that terminal sends the initial attach request to the first radio access network device). Therefore, it is more proper that session establishment information is notified to the first radio access network device on which the terminal device currently steadily camps, and then the first radio access network device notifies the terminal device of the session establishment information by using the initial attach request feedback.

In a possible implementation, the initial attach request feedback further includes an identifier that is of a radio access network device establishing a session connection to the fourth core network device and that is corresponding to each of the at least two user plane session connections, and the session configuration information further includes the identifier of the radio access network device. Because a session identifier in this embodiment of the present disclosure is mainly a session type, that is, a parameter related to a bearer type, the attach request feedback further needs to include a corresponding radio access network device identifier. In this case, when the terminal device needs to send a related data service, the terminal device may learn of a specific device that is corresponding to the radio access network device identifier and to which the terminal device needs to initiate a session.

In a possible implementation, the second request further includes at least one of a first identifier of the terminal device, an identifier of the first radio access network device, and current quality of service information of a user plane session connection, and the first identifier is used to uniquely identify the terminal device within a control range of a first core network device. For a specific function and a beneficial effect, refer to the detailed descriptions in the embodiment corresponding to FIG. 2a. Details are not described herein again.

Step S505: The first radio access network device sends a second request feedback to the fourth core network device in response to the second request, and the fourth core network device receives the second request feedback that is sent by the first radio access network device in response to the second request.

Specifically, the second request feedback includes session status information used to indicate whether the user plane session connection is successfully established, and the second request feedback includes session status information used to indicate whether the user plane session connection between the first radio access network device and the fourth core network device is successfully established. The second request feedback includes session status information indicating whether a user plane session connection that the third core network device instructs to establish is successfully established, to notify the fourth core network device of a current session establishment status. It can be understood that parameter information and the like related to the user plane session establishment are also included.

Step S506: The fourth core network device sends a third request to the second radio access network device, and the second radio access network device receives the third request sent by the fourth core network device, where the fourth core network device is configured to execute the user plane function and the session management function of the core network.

Specifically, the third request includes related information used to instruct the second radio access network device to establish a user plane session connection to the fourth core network device. When the fourth core network device needs to establish a session connection to the second radio access network device, the fourth core network device sends the third request to the second radio access network device. For a specific function and content of the third request, refer to the descriptions in step S504. Details are not described herein again.

Step S507: The second radio access network device sends a third request feedback to the fourth core network device in response to the third request, and the fourth core network device receives the third request feedback that is sent by the first radio access network device in response to the third request.

Specifically, the third request feedback includes session status information used to indicate whether the user plane session connection is successfully established, and the third request feedback includes session status information used to indicate whether the user plane session connection between the second radio access network device and the fourth core network device is successfully established. For step S506 and step S507, correspondingly refer to step S504 and step S505 in this embodiment of the present disclosure. Specific implementations are not described herein again.

It should be emphasized that step S506 and step S507 may be performed at the same time as, before, or after step S504 and step S505 (a specific execution sequence is not limited in the present disclosure). This is not specifically limited in the present disclosure.

Step S508: The fourth core network device sends a session establishment request feedback to the third core network device in response to the session establishment request, and the third core network device receives the session establishment request feedback that is sent by the fourth core network device in response to the session establishment request.

Specifically, the session establishment request feedback includes the session identifiers of the at least two user plane session connections, and the session identifier is used to indicate a session connection established between the first radio access network device and the fourth core network device and/or the session identifier is used to indicate a session connection established between the second radio access network device and the fourth core network device. After receiving the second request feedback and/or the third request feedback, the fourth core network device sends, based on content of the second request feedback and/or the third request feedback, the session establishment request feedback to the third core network device in response to the session establishment request sent in step S503. Correspondingly, the session establishment request feedback includes the session identifiers of the at least two user plane session connections, and the session identifier is used to indicate the session connection established between the first radio access network device and the fourth core network device and/or the session identifier is used to indicate the session connection established between the second radio access network device and the fourth core network device.

Step S509: The third core network device sends an initial attach request feedback to the first radio access network device in response to the initial attach request, and the first radio access network device receives the initial attach request feedback that is sent by the third core network device in response to the initial attach request.

Specifically, the initial attach request feedback includes the session identifiers of the at least two user plane session connections. The initial attach request feedback includes the session identifiers of the at least two user plane session connections, and the session identifier is used to indicate the session connection established between the first radio access network device and the fourth core network device and/or the session identifier is used to indicate the session connection established between the second radio access network device and the fourth core network device. After receiving the session establishment request feedback fed back by the fourth core network device, the third core network device sends, to the first radio access network device based on a session identifier of an established session connection in the session establishment request feedback, the initial attach request feedback that includes the session identifier.

Step S510: The first radio access network device sends session configuration information to the terminal device, and the terminal device receives the session configuration information sent by the first radio access network device.

Specifically, the session configuration information includes the session identifiers of the at least two user plane session connections. The session configuration information is sent after the first radio access network device receives the initial attach request feedback that is sent by the first core network device in response to the initial attach request, the session configuration information includes the session identifiers of the at least two user plane session connections, the session identifier is used to indicate the session connection established between the first radio access network device and the fourth core network device and/or the session identifier is used to indicate the session connection established between the second radio access network device and the fourth core network device, the third core network device is configured to execute the common control plane function of the core network, and the fourth core network device is configured to execute the user plane function and the session management function of the core network. The first radio access network device finally sends the session configuration information to the terminal device based on the received initial attach request feedback, and the session configuration information includes the session identifiers of the at least two user plane session connections established by the fourth core network device for the terminal device. Therefore, the terminal device may send related service data to a corresponding radio access network device based on the session identifier when the terminal device needs to perform a corresponding data service. Then the terminal device performs efficient communication transmission by using an established user plane session connection.

In a possible implementation, the session connection configuration information further includes a list of sessions that fail to be established. Because the session establishment request in step S505 may include all session connections that the terminal device expects or needs to establish, the session configuration information may include the list of sessions that fail to be established, so that the terminal device can learn, from the session establishment request, which session is successfully established and which session currently fails to be established. In this way, when a session connection needs to be established subsequently, the corresponding list may be used for reference, to improve session establishment efficiency.

In this embodiment of the present disclosure, the inventive concepts and the beneficial effects in the embodiment corresponding to FIG. 2a are maintained, that is, different communication requirements of different data services are met, and data service transmission quality and efficiency are finally improved.

In addition, the session management function originally executed by the third core network device (corresponding to the first core network device in FIG. 2a) is executed by the fourth core network device (corresponding to the second core network device in FIG. 2a), that is, user-plane session connection management is initiated by the fourth core network device, and the first access network device makes a response. After a session connection is established, the third core network device feeds back a session connection establishment related message to the first radio access network device. A core network device of each user plane may plan and manage a procedure of establishing a session connection by the core network device, that is, different core network devices perform personalized management on different data services, and session transmission is finally performed through different user plane session connections. This can better meet various QoS requirements of different services.

To facilitate better implementation of the session connection establishment method corresponding to FIG. 2a and FIG. 3a (including FIG. 2b and FIG. 3b-1 and FIG. 3b-2) in the embodiments of the present disclosure, the present disclosure further provides a related device for implementing the foregoing method.

Figure 6:
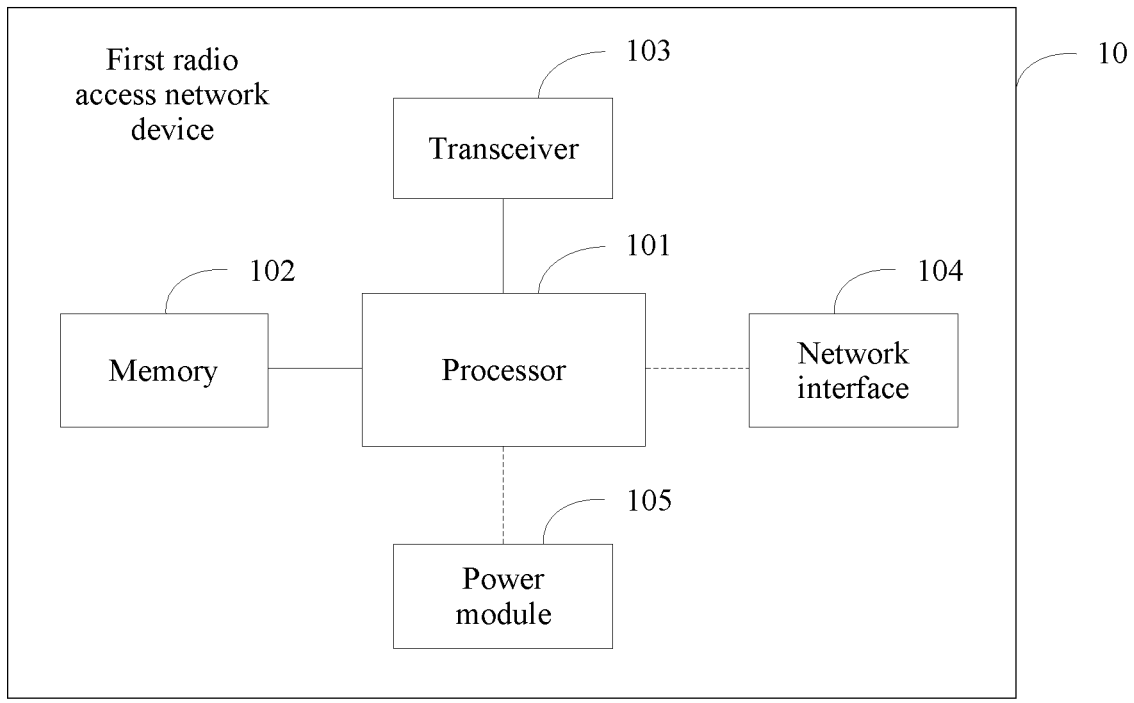
FIG. 6 is a schematic structural diagram of a radio access network device according to an embodiment of the present disclosure.

FIG. 6 is a schematic structural diagram of a radio access network device according to an embodiment of the present disclosure. The radio access network device is a first radio access network device in the present disclosure. As shown in FIG. 6, a first radio access network device 10 includes a processor 101, a memory 102, and a transceiver 103. The processor 101, the memory 102, and the transceiver 103 may be connected through a bus or in another manner.

Optionally, the first radio access network device 10 may further include a network interface 104 and a power module 105.

The processor 101 may be a digital signal processing (DSP) chip.

The memory 102 is configured to store an instruction. In specific implementation, the memory 102 may be a read-only memory (ROM) or a random access memory (RAM). In this embodiment of the present disclosure, the memory 102 is configured to store program code for establishing a session connection.

The transceiver 103 is configured to receive/send a signal.

The network interface 104 is configured to perform data communication between the radio access network device 10 and another device. The network interface 104 may be a wired interface or a wireless interface.

The power module 105 is configured to supply power to the modules of the radio access network device 10.

The processor 101 is configured to invoke the instruction stored in the memory 102, to perform the following operations:

receiving, by using the transceiver 103, an initial attach request sent by a terminal device;

sending the initial attach request to a first core network device by using the transceiver 103;

receiving, by using the transceiver 103, an initial attach request feedback that is sent by the first core network device in response to the initial attach request, where the initial attach request feedback includes session identifiers of at least two user plane session connections, the session identifier is used to indicate a session connection established between the first radio access network device and a second core network device and/or the session identifier is used to indicate a session connection established between a second radio access network device and the second core network device, the first core network device is configured to execute a common control plane function of a core network, and the second core network device is configured to execute a user plane function of the core network; and sending session configuration information to the terminal device by using the transceiver 103, where the session configuration information includes the session identifiers of the at least two user plane session connections.

Specifically, the initial attach request feedback further includes an identifier that is of a radio access network device establishing a session connection to the second core network device and that is corresponding to each of the at least two user plane session connections, and the session configuration information further includes the identifier of the radio access network device.

Further, the initial attach request includes a first initial attach request or a second initial attach request.

The first initial attach request includes at least one of channel state information between the terminal device and the first radio access network device, channel state information between the terminal device and the second radio access network device, and an identifier of the second radio access network device.

The second initial attach request includes preset service identifiers respectively corresponding to at least two preset services of the terminal device and includes at least one of the following: network slice identifiers respectively corresponding to the at least two preset services, an identifier of the first radio access network device, and the identifier of the second radio access network device, and the network slice identifier is used by the first core network device to select the second core network device from a corresponding network slice based on the network slice identifier.

Still further, the first initial attach request information further includes network slice capability information of the terminal device, and the network slice capability information is used to indicate a quantity of network slices that can be accessed by the terminal device and/or a network slice that can be accessed by the terminal device.

Still further, the session identifier is used to indicate the session connection established between the second radio access network device and the second core network device; or the session identifier is used to indicate the session connection established between the first radio access network device and the second core network device and is used to indicate the session connection established between the second radio access network device and the second core network device.

Before sending the session configuration information to the terminal device by using the transceiver, the processor 101 is further configured to:

send a first request to the second radio access network device by using the transceiver 103, where the first request includes at least one of the following: a first identifier of the terminal device, at least one of the session identifiers of the at least two user plane session connections, and an identifier of the second core network device, and the first identifier is used to uniquely identify the terminal device within a control range of the first radio access network device; and receive, by using the transceiver 103, a first request feedback that is sent by the second radio access network device in response to the first request, where the first request feedback includes at least one of establishment status information of the at least two user plane session connections, the identifier of the second radio access network device, a session identifier of a session connection that is in the at least one user plane session connection and that has been successfully established in the second radio access network device, and a second identifier allocated by the second radio access network device to the terminal device, and the second identifier is used to uniquely identify the terminal device within a coverage area of the second radio access network device.

Still further, the session configuration information further includes session status information, the session status identifier information is used to indicate a session status of a session connection corresponding to the session identifier, and the session status includes a radio resource connection RRC connected mode, an RRC idle mode, and a third RRC mode.

It should be noted that, for functions of the function modules of the first radio access network device 10 described in this embodiment of the present disclosure, refer to the related descriptions of the corresponding first radio access network device in the embodiments shown in FIG. 2*a* to FIG. 3*a* (including FIG. 2*b* and FIG. 3*b*-1 and FIG. 3*b*-2). Details are not described herein again.

Figure 7:
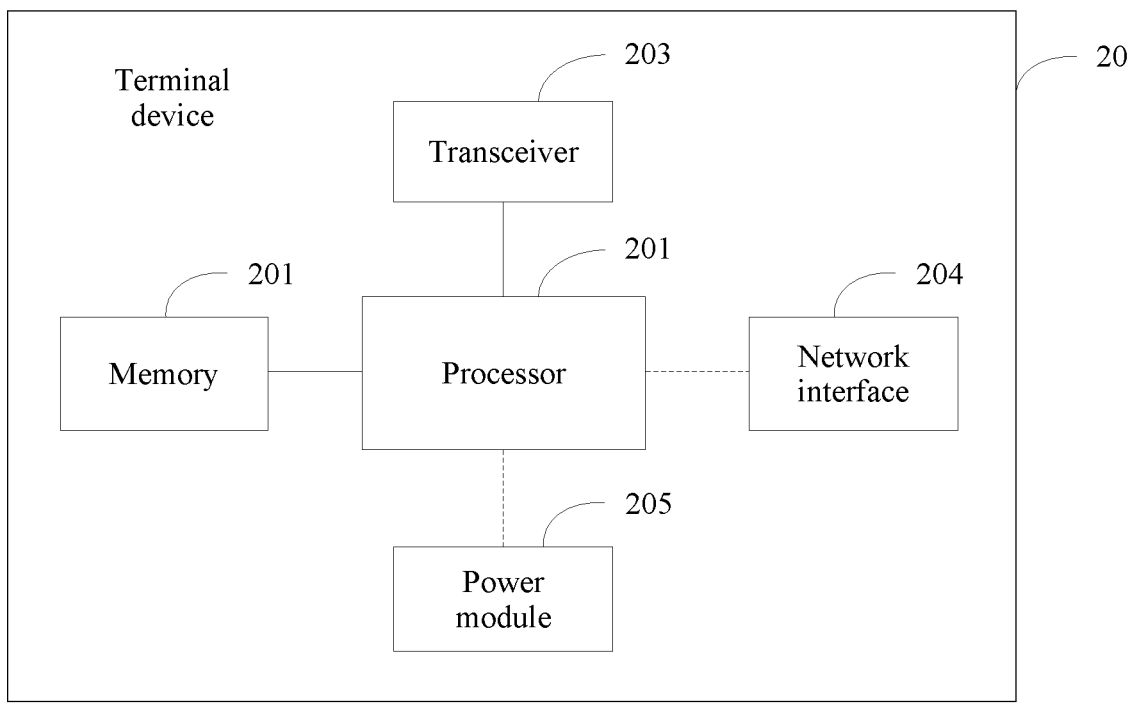
FIG. 7 is a schematic structural diagram of a terminal device according to an embodiment of the present disclosure.

FIG. 7 is a schematic structural diagram of a terminal device according to an embodiment of the present disclosure. As shown in FIG. 7, a terminal device 20 includes a processor 201, a memory 202, and a transceiver 203. The processor 201, the memory 202, and the transceiver 203 may be connected through a bus or in another manner.

Optionally, the terminal device 20 may further include a network interface 204 and a power module 205.

The processor 201 may be a digital signal processing (DSP) chip.

The memory 202 is configured to store an instruction. In specific implementation, the memory 202 may be a read-only memory (ROM) or a random access memory (RAM). In this embodiment of the present disclosure, the memory 202 is configured to store program code for establishing a session connection.

The transceiver 203 is configured to receive/send a signal.

The network interface 204 is configured to perform data communication between the terminal device 20 and another device. The network interface 204 may be a wired interface or a wireless interface.

The power module 205 is configured to supply power to the modules of the terminal device 20.

The processor 201 is configured to invoke the instruction stored in the memory 202, to perform the following operations:

sending an initial attach request to a first radio access network device by using the transceiver 203; and receiving, by using the transceiver 203, session configuration information sent by the first radio access network device, where the session configuration information is sent after the first radio access network device receives an initial attach request feedback that is sent by a first core network device in response to the initial attach request, the session configuration information includes session identifiers of at least two user plane session connections, the session identifier is used to indicate a session connection established between the first radio access network device and a second core network device and/or the session identifier is used to indicate a session connection established between a second radio access network device and the second core network device, the first core network device is configured to execute a common control plane function of a core network, and the second core network device is configured to execute a user plane function of the core network.

Specifically, the initial attach request feedback further includes an identifier that is of a radio access network device establishing a session connection to the second core network device and that is corresponding to each of the at least two user plane session connections, and the session configuration information further includes the identifier of the radio access network device.

Further, the processor 201 is further configured to:

perform data session transmission on the at least two user plane session connections based on the session identifier and the identifier of the radio access network device.

It should be noted that, for functions of the function modules of the terminal device 20 described in this embodiment of the present disclosure, refer to the related descriptions of the corresponding terminal device in the embodiments shown in FIG. 2a to FIG. 3a (including FIG. 2b and FIG. 3b-1 and FIG. 3b-2). Details are not described herein again.

Figure 8:
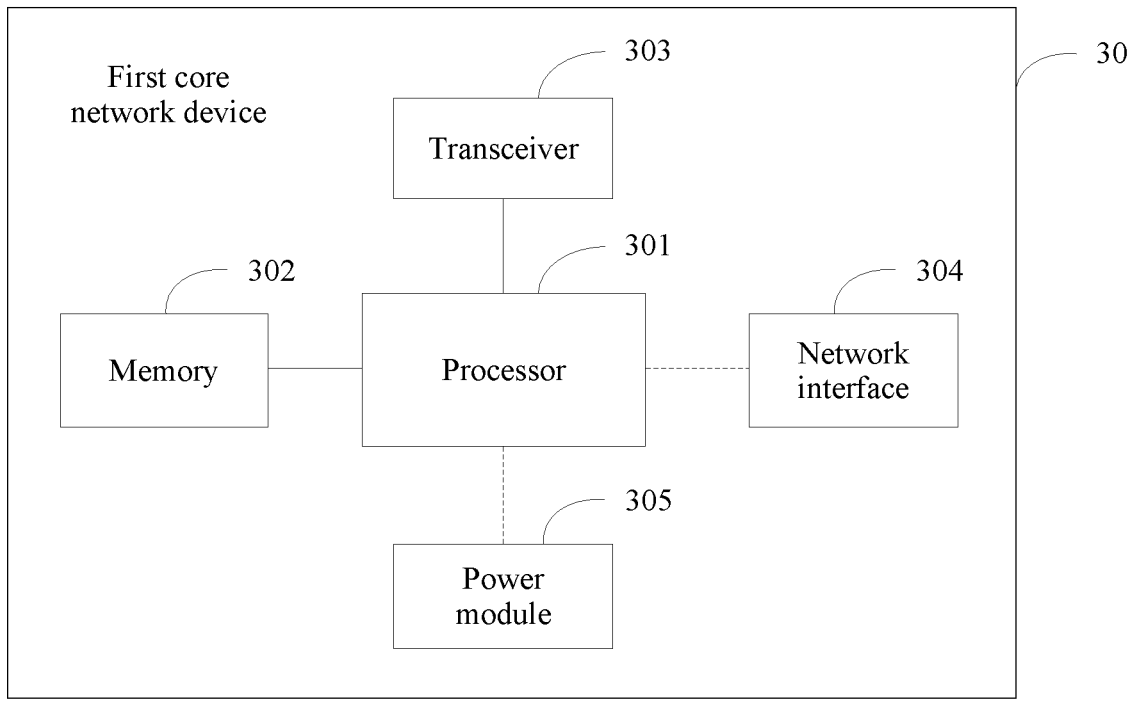
FIG. 8 is a schematic structural diagram of a core network device according to an embodiment of the present disclosure.

FIG. 8 is a schematic structural diagram of a core network device according to an embodiment of the present disclosure. The core network device is a first core network device in this embodiment of the present disclosure. As shown in FIG. 8, a first core network device 30 includes a processor 301, a memory 302, and a transceiver 303. The processor 301, the memory 302, and the transceiver 303 may be connected through a bus or in another manner.

Optionally, the first core network device 30 may further include a network interface 304 and a power module 305.

The processor 301 may be a digital signal processing (DSP) chip.

The memory 302 is configured to store an instruction. In specific implementation, the memory 302 may be a read-only memory (ROM) or a random access memory (RAM). In this embodiment of the present disclosure, the memory 302 is configured to store program code for establishing a session connection.

The transceiver 303 is configured to receive/send a signal.

The network interface 304 is configured to perform data communication between the first core network device 30 and another device. The network interface 304 may be a wired interface or a wireless interface.

The power module 305 is configured to supply power to the modules of the first core network device 30.

The processor 301 is configured to invoke the instruction stored in the memory 302, to perform the following operations:

receiving, by using the transceiver 303, an initial attach request sent by a first radio access network device; and sending, by using the transceiver 303, an initial attach request feedback to the first radio access network device in response to the initial attach request, where the initial attach request feedback includes session identifiers of at least two user plane session connections, the session identifier is used to indicate a session connection established between the first radio access network device and a second core network device and/or the session identifier is used to indicate a session connection established between a second radio access network device and the second core network device, the first core network device is configured to execute a common control plane function of a core network, and the second core network device is configured to execute a user plane function of the core network.

It should be noted that, for functions of the function modules of the first core network device 30 described in this embodiment of the present disclosure, refer to the related descriptions of the corresponding first core network device 30 in the embodiments shown in FIG. 2a to FIG. 3a (including FIG. 2b and FIG. 3b-1 and FIG. 3b-2). Details are not described herein again.

To facilitate better implementation of the session connection establishment method corresponding to FIG. 5A and FIG. 5B in the embodiments of the present disclosure, the present disclosure further provides a related device for implementing the foregoing method.

Figure 9:
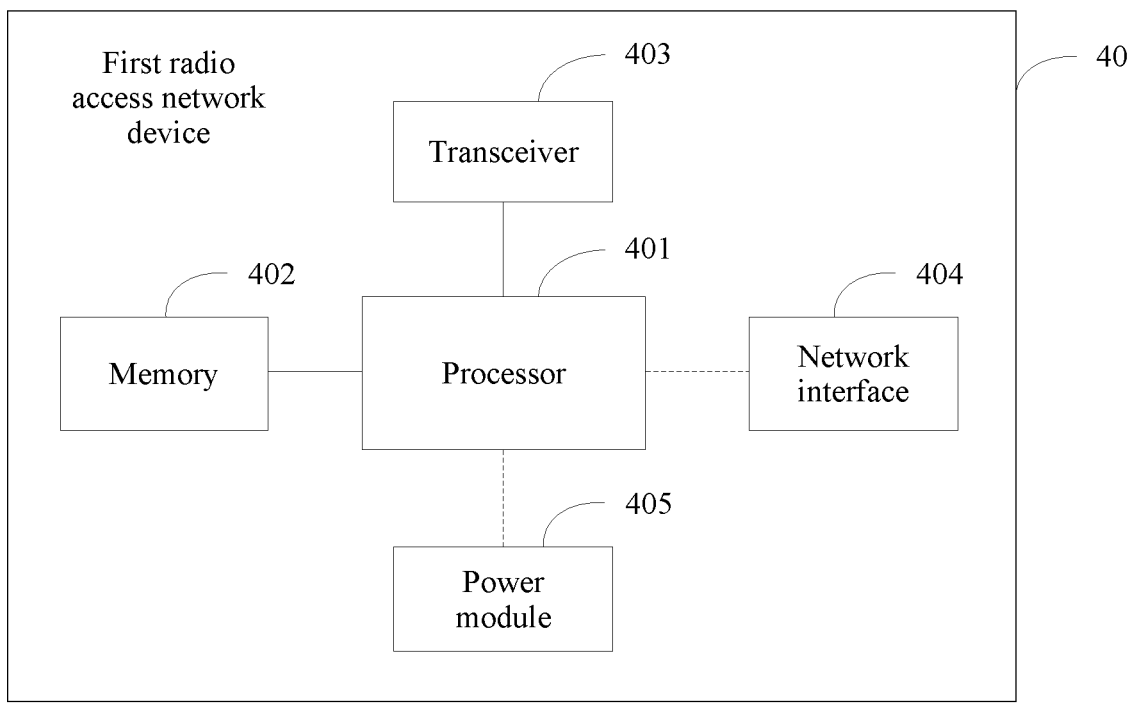
FIG. 9 is a schematic structural diagram of another radio access network device according to an embodiment of the present disclosure.

FIG. 9 is a schematic structural diagram of another radio access network device according to an embodiment of the present disclosure. The radio access network device is a first radio access network device. As shown in FIG. 9, a first radio access network device 40 includes a processor 401, a memory 402, and a transceiver 403. The processor 401, the memory 402, and the transceiver 403 may be connected through a bus or in another manner.

Optionally, the first radio access network device 40 may further include a network interface 404 and a power module 405.

The processor 401 may be a digital signal processing (DSP) chip.

The memory 402 is configured to store an instruction. In specific implementation, the memory 402 may be a read-only memory (ROM) or a random access memory (RAM). In this embodiment of the present disclosure, the memory 402 is configured to store program code for establishing a session connection.

The transceiver 403 is configured to receive/send a signal.

The network interface 404 is configured to perform data communication between the first radio access network device 40 and another device. The network interface 404 may be a wired interface or a wireless interface.

The power module 405 is configured to supply power to the modules of the first radio access network device 40.

The processor 401 is configured to invoke the instruction stored in the memory 402, to perform the following operations:

receiving, by using the transceiver 403, an initial attach request sent by a terminal device;

sending the initial attach request to a third core network device by using the transceiver 403, where the third core network device is configured to execute a common control plane function of a core network;

when the first radio access network device needs to establish a session connection, receiving, by using the transceiver 403, a second request sent by a fourth core network device, where the second request includes related information used to instruct the first radio access network device to establish a user plane session connection to the fourth core network device, and the fourth core network device is configured to execute a user plane function and a session management function of the core network; and sending, by using the transceiver 403, a second request feedback to the fourth core network device in response to the second request, where the second request feedback includes session status information used to indicate whether the user plane session connection is successfully established.

Specifically, the processor 401 is further configured to: receive, by using the transceiver 403, an initial attach request feedback that is sent by the third core network device in response to the initial attach request, where the initial attach request feedback includes session identifiers of at least two user plane session connections, and the session identifier is used to indicate a session connection established between the first radio access network device and the fourth core network device and/or the session identifier is used to indicate a session connection established between a second radio access network device and the fourth core network device; and send session configuration information to the terminal device by using the transceiver 403, where the session configuration information includes the session identifiers of the at least two user plane session connections.

Further, the processor 401 is further configured to: when the first radio access network device does not need to establish a session connection, after sending the initial attach request to the third core network device by using the transceiver 403, receive, by using the transceiver 403, an initial attach request feedback that is sent by the third core network device in response to the initial attach request, where the initial attach request feedback includes session identifiers of at least two user plane session connections, and the session identifier is used to indicate a session connection established between a second radio access network device and the fourth core network device; and send session configuration information to the terminal device by using the transceiver 403, where the session configuration information includes the session identifiers of the at least two user plane session connections.

Further, the initial attach request feedback further includes an identifier that is of a radio access network device establishing a session connection to the fourth core network device and that is corresponding to each of the at least two user plane session connections, and the session configuration information further includes the identifier of the radio access network device.

Still further, the second request further includes at least one of a first identifier of the terminal device, an identifier of the first radio access network device, and current quality of service information of a user plane session connection, and the first identifier is used to uniquely identify the terminal device within a control range of a first core network device.

It should be noted that, for functions of the function modules of the first radio access network device 40 described in this embodiment of the present disclosure, refer to the related descriptions of the corresponding first radio access network device in the embodiments shown in FIG. 2*a* to FIG. 3*a* (including FIG. 2*b* and FIG. 3*b*-1 and FIG. 3*b*-2). Details are not described herein again.

Figure 10:
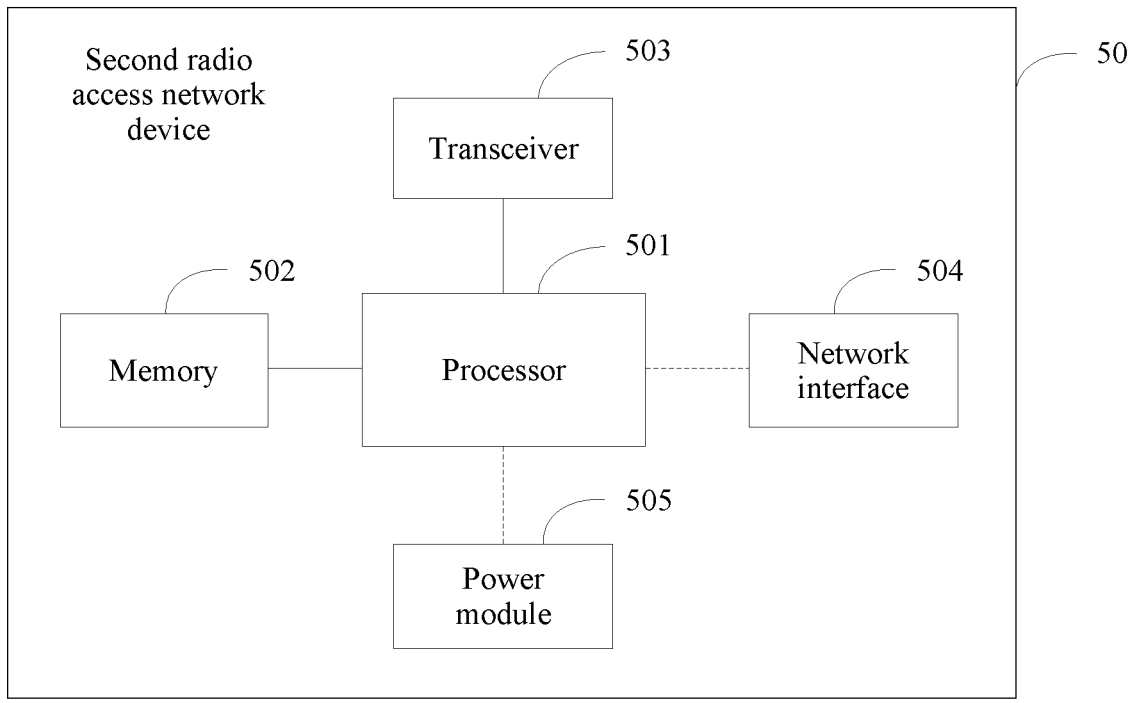
FIG. 10 is a schematic structural diagram of still another radio access network device according to an embodiment of the present disclosure.

FIG. 10 is a schematic structural diagram of still another radio access network device according to an embodiment of the present disclosure. The radio access network device is a second radio access network device. As shown in FIG. 10, a second radio access network device 50 includes a processor 501, a memory 502, and a transceiver 503. The processor 501, the memory 502, and the transceiver 503 may be connected through a bus or in another manner.

Optionally, the second radio access network device 50 may further include a network interface 504 and a power module 505.

The processor 501 may be a digital signal processing (DSP) chip.

The memory 502 is configured to store an instruction. In specific implementation, the memory 502 may be a read-only memory (ROM) or a random access memory (RAM). In this embodiment of the present disclosure, the memory 502 is configured to store program code for establishing a session connection.

The transceiver 503 is configured to receive/send a signal.

The network interface 504 is configured to perform data communication between the second radio access network device 50 and another device. The network interface 504 may be a wired interface or a wireless interface.

The power module 505 is configured to supply power to the modules of the second radio access network device 50.

The processor 501 is configured to invoke the instruction stored in the memory 502, to perform the following operations:

receiving, by using the transceiver 503, a third request sent by a fourth core network device, where the third request includes related information used to instruct the second radio access network device to establish a user plane session connection to the fourth core network device, and the fourth core network device is configured to execute a user plane function and a session management function of a core network; and sending, by using the transceiver 503, a third request feedback to the fourth core network device in response to the third request, where the third request feedback includes session status information used to indicate whether the user plane session connection is successfully established.

It should be noted that, for functions of the function modules of the second radio access network device 50 described in this embodiment of the present disclosure, refer to the related descriptions of the corresponding second radio access network device in the embodiments shown in FIG. 2a to FIG. 3a (including FIG. 2b and FIG. 3b-1 and FIG. 3b-2). Details are not described herein again.

Figure 11:
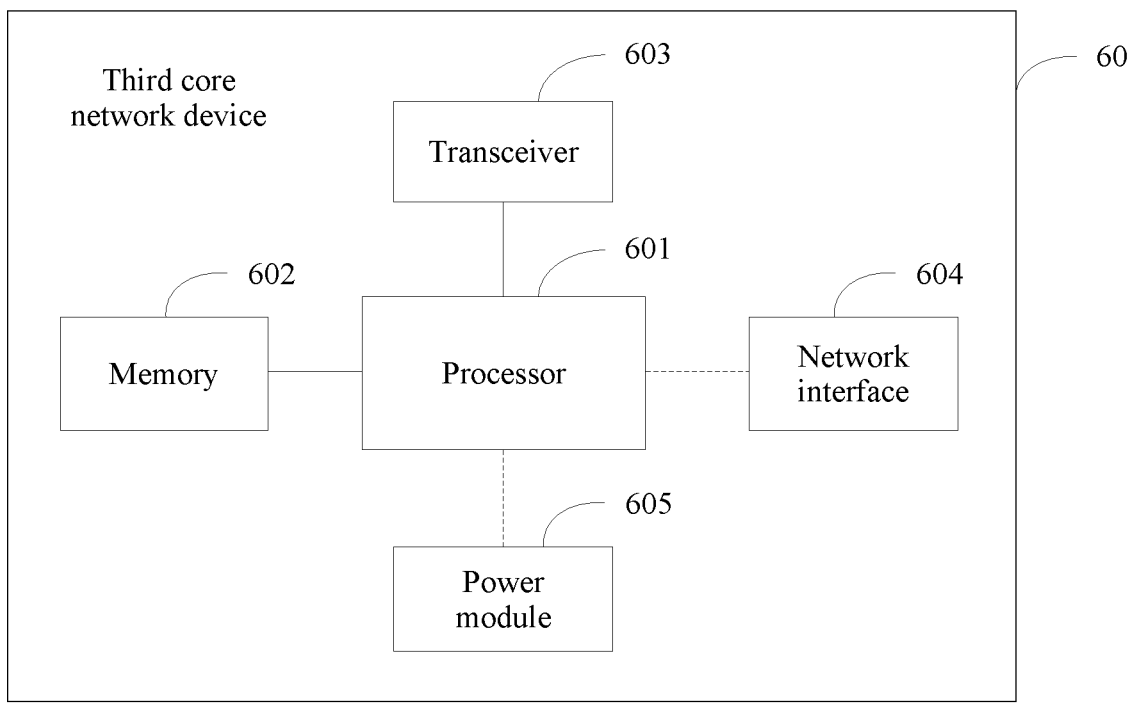
FIG. 11 is a schematic structural diagram of another core network device according to an embodiment of the present disclosure.

FIG. 11 is a schematic structural diagram of another core network device according to an embodiment of the present disclosure. The core network device is a third core network device. As shown in FIG. 11, a third core network device 60 includes a processor 601, a memory 602, and a transceiver 603. The processor 601, the memory 602, and the transceiver 603 may be connected through a bus or in another manner.

Optionally, the third core network device 60 may further include a network interface 604 and a power module 605.

The processor 601 may be a digital signal processing (DSP) chip.

The memory 602 is configured to store an instruction. In specific implementation, the memory 602 may be a read-only memory (ROM) or a random access memory (RAM). In this embodiment of the present disclosure, the memory 602 is configured to store program code for establishing a session connection.

The transceiver 603 is configured to receive/send a signal.

The network interface 604 is configured to perform data communication between the third core network device 60 and another device. The network interface 604 may be a wired interface or a wireless interface.

The power module 605 is configured to supply power to the modules of the third core network device 60.

The processor 601 is configured to invoke the instruction stored in the memory 602, to perform the following operations:

receiving, by using the transceiver 603, an initial attach request sent by a first radio access network device, where the third core network device is configured to execute a common control plane function of a core network;

sending a session establishment request to a fourth core network device by using the transceiver 603, where the fourth core network device is configured to execute a user plane function and a session management function of the core network;

receiving, by using the transceiver 603, a session establishment request feedback that is sent by the fourth core network device in response to the session establishment request, where the session establishment request feedback includes session identifiers of at least two user plane session connections, and the session identifier is used to indicate a session connection established between the first radio access network device and the fourth core network device and/or the session identifier is used to indicate a session connection established between a second radio access network device and the fourth core network device; and sending, by using the transceiver 603, an initial attach request feedback to the first radio access network device in response to the initial attach request, where the initial attach request feedback includes the session identifiers of the at least two user plane session connections.

It should be noted that, for functions of the function modules of the third core network device 60 described in this embodiment of the present disclosure, refer to the related descriptions of the corresponding third core network device in the embodiments shown in FIG. 2a to FIG. 3a (including FIG. 2b and FIG. 3b-1 and FIG. 3b-2). Details are not described herein again.

Figure 12:
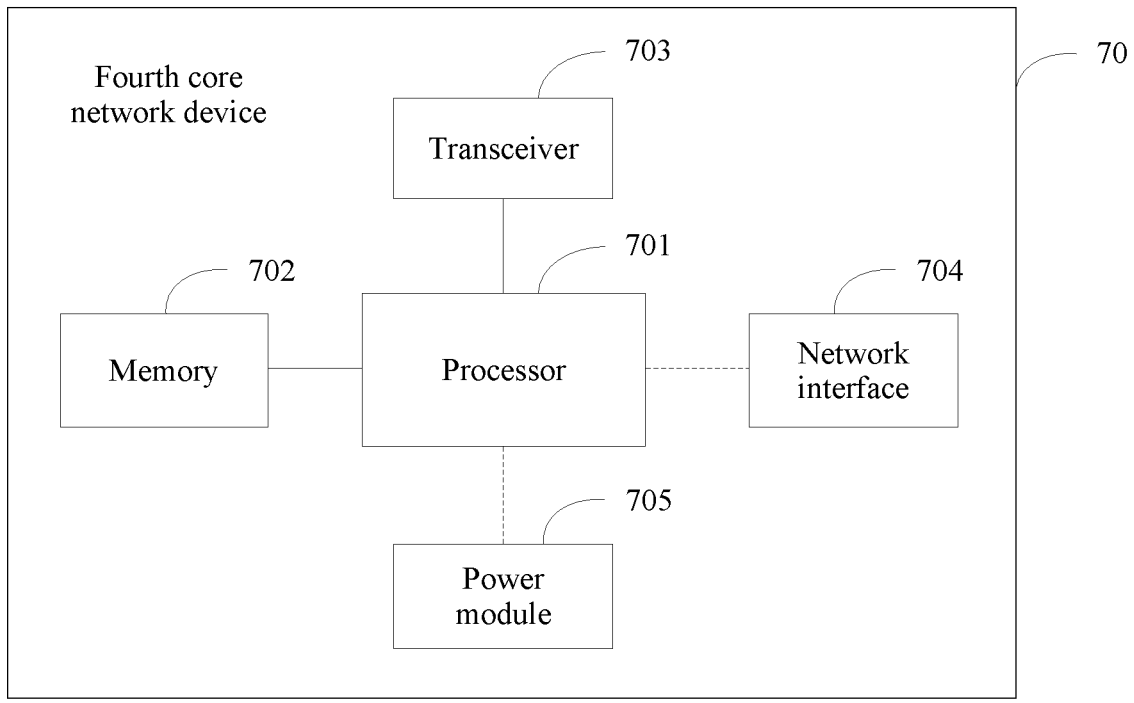
FIG. 12 is a schematic structural diagram of still another core network device according to an embodiment of the present disclosure.

FIG. 12 is a schematic structural diagram of still another core network device according to an embodiment of the present disclosure. The core network device is a fourth core network device. As shown in FIG. 9, a fourth core network device 70 includes a processor 701, a memory 702, and a transceiver 703. The processor 701, the memory 702, and the transceiver 703 may be connected through a bus or in another manner.

Optionally, the fourth core network device 70 may further include a network interface 704 and a power module 705.

The processor 701 may be a digital signal processing (DSP) chip.

The memory 702 is configured to store an instruction. In specific implementation, the memory 702 may be a read-only memory (ROM) or a random access memory (RAM). In this embodiment of the present disclosure, the memory 702 is configured to store program code for establishing a session connection.

The transceiver 703 is configured to receive/send a signal.

The network interface 704 is configured to perform data communication between the fourth core network device 70 and another device. The network interface 704 may be a wired interface or a wireless interface.

The power module 705 is configured to supply power to the modules of the fourth core network device 70.

The processor 701 is configured to invoke the instruction stored in the memory 702, to perform the following operations:

receiving, by using the transceiver 703, a session establishment request sent by a third core network device, where the third core network device is configured to execute a common control plane function of a core network, and the fourth core network device is configured to execute a user plane function and a session management function of the core network;

sending, by using the transceiver 703, a second request to a first radio access network device and/or a third request to a second radio access network device, where the second request includes related information used to instruct the first radio access network device to establish a user plane session connection to the fourth core network device, and the third request includes related information used to instruct the second radio access network device to establish a user plane session connection to the fourth core network device; and sending, by using the transceiver 703, a session establishment request feedback to the third core network device in response to the session establishment request, where the session establishment request feedback includes session identifiers of at least two user plane session connections, and the session identifier is used to indicate a session connection established between the first radio access network device and the fourth core network device and/or the session identifier is used to indicate a session connection established between the second radio access network device and the fourth core network device.

Specifically, before the processor 701 sends, by using the transceiver 703, the session establishment request feedback to the third core network device in response to the session establishment request, if the processor 701 further sends the second request to the first radio access network device by using the transceiver 703, the fourth core network device receives the second request feedback that is sent by the first radio access network device in response to the second request, where the second request feedback includes session status information used to indicate whether the user plane session connection between the first radio access network device and the fourth core network device is successfully established; and if the processor 701 sends the third request to the second radio access network device by using the transceiver 703, the fourth core network device receives, by using the transceiver 703, a third request feedback that is sent by the first radio access network device in response to the third request, where the third request feedback includes session status information used to indicate whether the user plane session connection between the second radio access network device and the fourth core network device is successfully established.

It should be noted that, for functions of the function modules of the fourth core network device 70 described in this embodiment of the present disclosure, refer to the related descriptions of the corresponding fourth core network device in the embodiments shown in FIG. 2a to FIG. 3a (including FIG. 2b and FIG. 3b-1 and FIG. 3b-2). Details are not described herein again.

Figure 13:
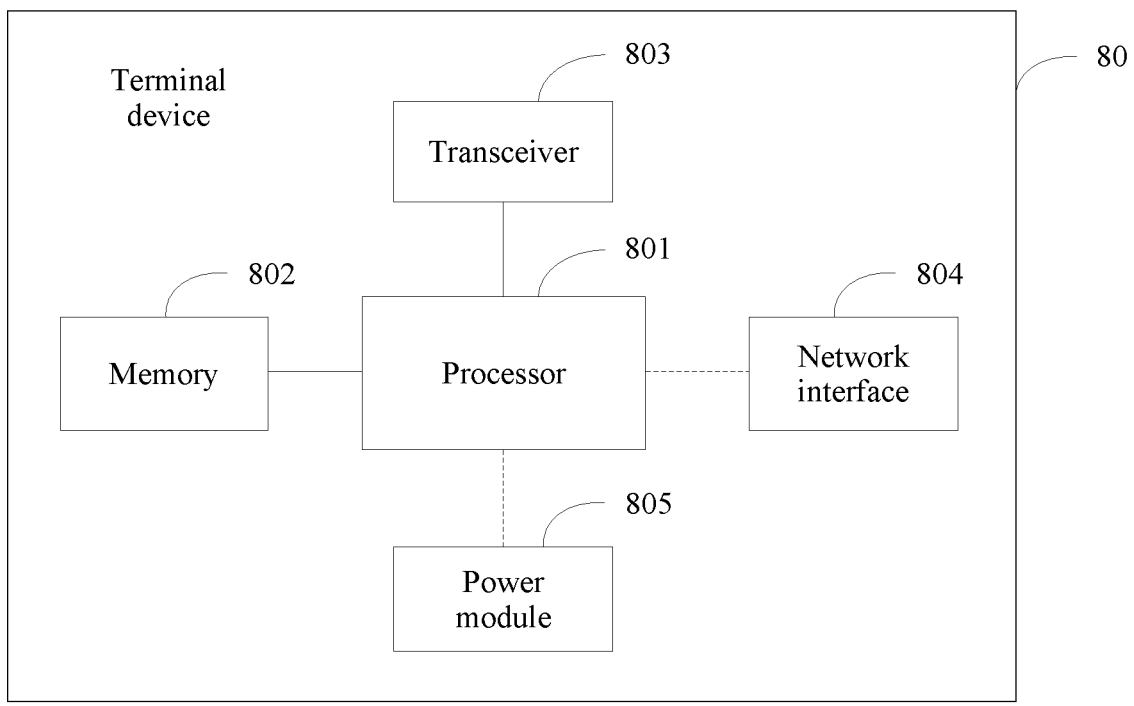
FIG. 13 is a schematic structural diagram of another terminal device according to an embodiment of the present disclosure.

FIG. 13 is a schematic structural diagram of another terminal device according to an embodiment of the present disclosure. As shown in FIG. 13, a terminal device 80 includes a processor 801, a memory 802, and a transceiver 803. The processor 801, the memory 802, and the transceiver 803 may be connected through a bus or in another manner.

Optionally, the terminal device 80 may further include a network interface 804 and a power module 805.

The processor 801 may be a digital signal processing (DSP) chip.

The memory 802 is configured to store an instruction. In specific implementation, the memory 802 may be a read-only memory (ROM) or a random access memory (RAM). In this embodiment of the present disclosure, the memory 802 is configured to store program code for establishing a session connection.

The transceiver 803 is configured to receive/send a signal.

The network interface 804 is configured to perform data communication between the terminal device 80 and another device. The network interface 804 may be a wired interface or a wireless interface.

The power module 805 is configured to supply power to the modules of the terminal device 80.

The processor 801 is configured to invoke the instruction stored in the memory 802, to perform the following operations:

sending an initial attach request to a first radio access network device by using the transceiver 803; and receiving, by using the transceiver 803, session configuration information sent by the first radio access network device, where the session configuration information is sent after the first radio access network device receives an initial attach request feedback that is sent by a first core network device in response to the initial attach request, the session configuration information includes session identifiers of at least two user plane session connections, the session identifier is used to indicate a session connection established between the first radio access network device and a fourth core network device and/or the session identifier is used to indicate a session connection established between a second radio access network device and the fourth core network device, a third core network device is configured to execute a common control plane function of a core network, and the fourth core network device is configured to execute a user plane function and a session management function of the core network.

It should be noted that, for functions of the function modules of the terminal device 80 described in this embodiment of the present disclosure, refer to the related descriptions of the corresponding terminal device in the embodiments shown in FIG. 2a to FIG. 3a (including FIG. 2b and FIG. 3b-1 and FIG. 3b-2). Details are not described herein again.

Figure 14:
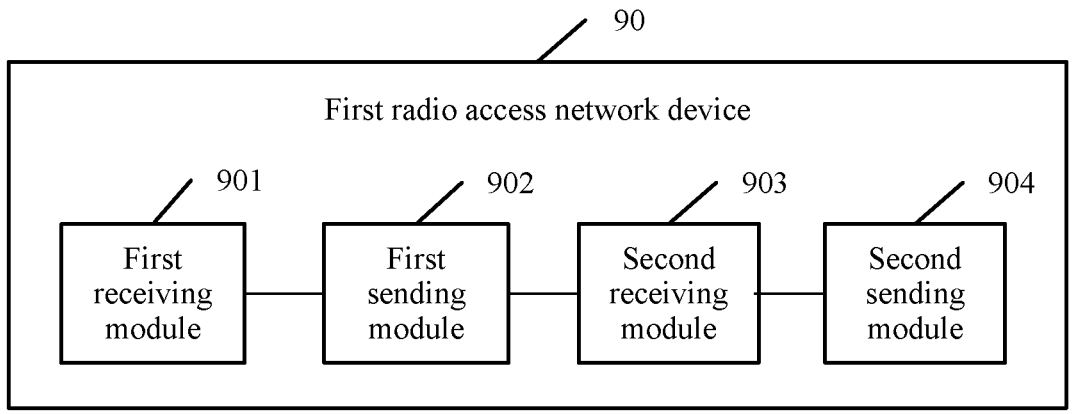
FIG. 14 is a schematic structural diagram of still another radio access network device according to an embodiment of the present disclosure.

FIG. 14 is a schematic structural diagram of still another radio access network device according to an embodiment of the present disclosure. The radio access network device is a first radio access network device. As shown in FIG. 14, a first radio access network device 90 includes a first receiving module 901, a first sending module 902, a second receiving module 903, and a second sending module 904.

The first receiving module 901 is configured to receive an initial attach request sent by a terminal device.

The first sending module 902 is configured to send the initial attach request to a first core network device.

The second receiving module 903 is configured to receive an initial attach request feedback that is sent by the first core network device in response to the initial attach request, where the initial attach request feedback includes session identifiers of at least two user plane session connections, the session identifier is used to indicate a session connection established between the first radio access network device and a second core network device and/or the session identifier is used to indicate a session connection established between a second radio access network device and the second core network device, the first core network device is configured to execute a common control plane function of a core network, and the second core network device is configured to execute a user plane function of the core network.

The second sending module 904 is configured to send session configuration information to the terminal device, where the session configuration information includes the session identifiers of the at least two user plane session connections.

Specifically, the initial attach request feedback further includes an identifier that is of a radio access network device establishing a session connection to the second core network device and that is corresponding to each of the at least two user plane session connections, and the session configuration information further includes the identifier of the radio access network device.

Further, the initial attach request includes a first initial attach request or a second initial attach request.

The first initial attach request includes at least one of channel state information between the terminal device and the first radio access network device, channel state information between the terminal device and the second radio access network device, and an identifier of the second radio access network device.

The second initial attach request includes preset service identifiers respectively corresponding to at least two preset services of the terminal device and includes at least one of the following: network slice identifiers respectively corresponding to the at least two preset services, an identifier of the first radio access network device, and the identifier of the second radio access network device, and the network slice identifier is used by the first core network device to select the second core network device from a corresponding network slice based on the network slice identifier.

Still further, the first initial attach request information further includes network slice capability information of the terminal device, and the network slice capability information is used to indicate a quantity of network slices that can be accessed by the terminal device and/or a network slice that can be accessed by the terminal device.

Still further, the session identifier is used to indicate the session connection established between the second radio access network device and the second core network device;

or the session identifier is used to indicate the session connection established between the first radio access network device and the second core network device and is used to indicate the session connection established between the second radio access network device and the second core network device.

Before sending the session configuration information to the terminal device, the first radio access network device further includes:

a request module, configured to send a first request to the second radio access network device, where the first request includes at least one of the following: a first identifier of the terminal device, at least one of the session identifiers of the at least two user plane session connections, and an identifier of the second core network device, and the first identifier is used to uniquely identify the terminal device within a control range of the first radio access network device; and a feedback module, configured to receive a first request feedback that is sent by the second radio access network device in response to the first request, where the first request feedback includes at least one of establishment status information of the at least two user plane session connections, the identifier of the second radio access network device, a session identifier of a session connection that is in the at least one user plane session connection and that has been successfully established in the second radio access network device, and a second identifier allocated by the second radio access network device to the terminal device, and the second identifier is used to uniquely identify the terminal device within a coverage area of the second radio access network device.

Still further, the session configuration information further includes session status information, the session status identifier information is used to indicate a session status of a session connection corresponding to the session identifier, and the session status includes a radio resource connection RRC connected mode, an RRC idle mode, and a third RRC mode.

It should be noted that, for functions of the function modules of the first radio access network device 90 described in this embodiment of the present disclosure, refer to the related descriptions of the corresponding first radio access network device in the embodiments shown in FIG. 2*a* to FIG. 3*a* (including FIG. 2*b* and FIG. 3*b*-1 and FIG. 3*b*-2). Details are not described herein again.

Figure 15:
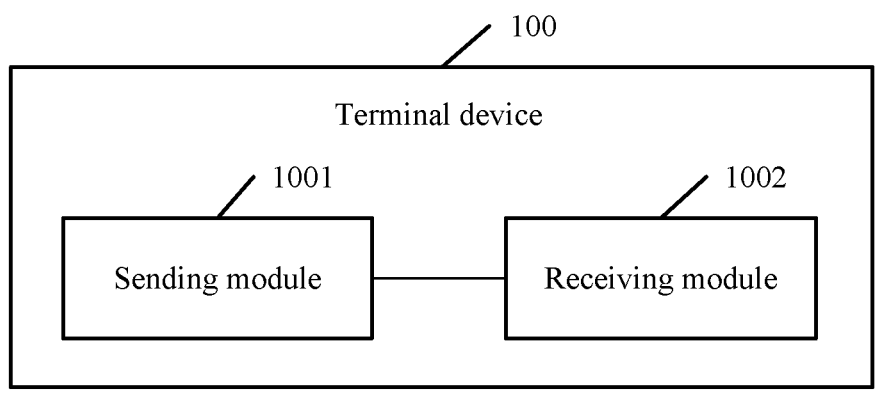
FIG. 15 is a schematic structural diagram of still another terminal device according to an embodiment of the present disclosure.

FIG. 15 is a schematic structural diagram of still another terminal device according to an embodiment of the present disclosure. As shown in FIG. 15, a terminal device 100 includes a sending module 1001 and a receiving module 1002.

The sending module 1001 is configured to send an initial attach request to a first radio access network device.

The receiving module 1002 is configured to receive session configuration information sent by the first radio access network device, where the session configuration information is sent after the first radio access network device receives an initial attach request feedback that is sent by a first core network device in response to the initial attach request, the session configuration information includes session identifiers of at least two user plane session connections, the session identifier is used to indicate a session connection established between the first radio access network device and a second core network device and/or the session identifier is used to indicate a session connection established between a second radio access network device and the second core network device, the first core network device is configured to execute a common control plane function of a core network, and the second core network device is configured to execute a user plane function of the core network.

Specifically, the initial attach request feedback further includes an identifier that is of a radio access network device establishing a session connection to the second core network device and that is corresponding to each of the at least two user plane session connections, and the session configuration information further includes the identifier of the radio access network device.

Further, the terminal device further includes:

a transmission module, configured to perform data session transmission on the at least two user plane session connections based on the session identifier and the identifier of the radio access network device.

It should be noted that, for functions of the function modules of the terminal device 100 described in this embodiment of the present disclosure, refer to the related descriptions of the corresponding terminal device in the embodiments shown in FIG. 2*a* to FIG. 3*a* (including FIG. 2*b* and FIG. 3*b*-1 and FIG. 3*b*-2). Details are not described herein again.

Figure 16:
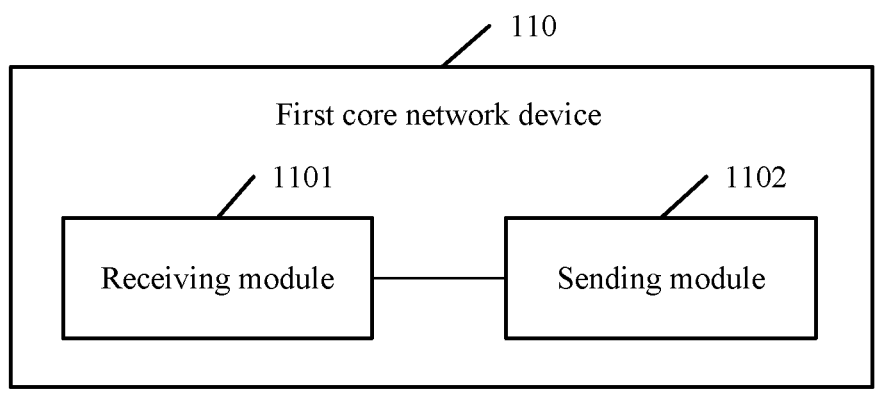
FIG. 16 is a schematic structural diagram of still another core network device according to an embodiment of the present disclosure.

FIG. 16 is a schematic structural diagram of still another core network device according to an embodiment of the present disclosure. The core network device is a first core network device. As shown in FIG. 16, a first core network device 110 includes a receiving module 1101 and a sending module 1102.

The receiving module 1101 is configured to receive an initial attach request sent by a first radio access network device.

The sending module 1102 is configured to send an initial attach request feedback to the first radio access network device in response to the initial attach request, where the initial attach request feedback includes session identifiers of at least two user plane session connections, the session identifier is used to indicate a session connection established between the first radio access network device and a second core network device and/or the session identifier is used to indicate a session connection established between a second radio access network device and the second core network device, the first core network device is configured to execute a common control plane function of a core network, and the second core network device is configured to execute a user plane function of the core network.

It should be noted that, for functions of the function modules of the first core network device 110 described in this embodiment of the present disclosure, refer to the related descriptions of the corresponding first radio access network device in the embodiments shown in FIG. 2*a* to FIG. 3*a* (including FIG. 2*b* and FIG. 3*b*-1 and FIG. 3*b*-2). Details are not described herein again.

Figure 17:
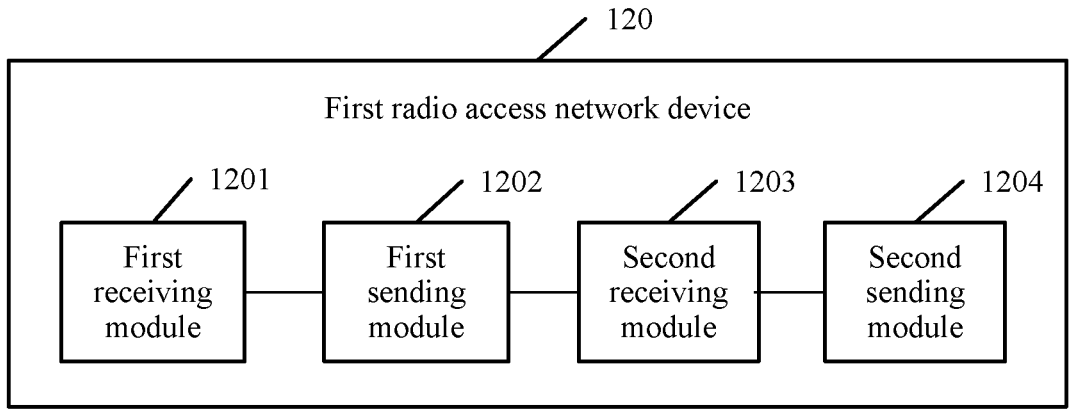
FIG. 17 is a schematic structural diagram of still another radio access network device according to an embodiment of the present disclosure.

FIG. 17 is a schematic structural diagram of still another radio access network device according to an embodiment of the present disclosure. The radio access network device is a first radio access network device. As shown in FIG. 17, a first radio access network device 120 includes a first receiving module 1201, a first sending module 1202, a second receiving module 1203, and a second sending module 1204.

The first receiving module 1201 is configured to receive an initial attach request sent by a terminal device.

The first sending module 1202 is configured to send the initial attach request to a third core network device, where the third core network device is configured to execute a common control plane function of a core network.

The second receiving module 1203 is configured to: when the first radio access network device needs to establish a session connection, receive a second request sent by a fourth core network device, where the second request includes related information used to instruct the first radio access network device to establish a user plane session connection to the fourth core network device, and the fourth core network device is configured to execute a user plane function and a session management function of the core network.

The second sending module 1204 is configured to send a second request feedback to the fourth core network device in response to the second request, where the second request feedback includes session status information used to indicate whether the user plane session connection is successfully established.

Specifically, the first radio access network device further includes:

a third receiving module, configured to receive an initial attach request feedback that is sent by the third core network device in response to the initial attach request, where the initial attach request feedback includes session identifiers of at least two user plane session connections, and the session identifier is used to indicate a session connection established between the first radio access network device and the fourth core network device and/or the session identifier is used to indicate a session connection established between a second radio access network device and the fourth core network device; and a third sending module, configured to send session configuration information to the terminal device, where the session configuration information includes the session identifiers of the at least two user plane session connections.

Specifically, the first radio access network device further includes:

a fourth receiving module, configured to receive an initial attach request feedback that is sent by the third core network device in response to the initial attach request, where the initial attach request feedback includes session identifiers of at least two user plane session connections, and the session identifier is used to indicate a session connection established between a second radio access network device and the fourth core network device; and a fourth sending module, configured to send session configuration information to the terminal device, where the session configuration information includes the session identifiers of the at least two user plane session connections.

Further, the initial attach request feedback further includes an identifier that is of a radio access network device establishing a session connection to the fourth core network device and that is corresponding to each of the at least two user plane session connections, and the session configuration information further includes the identifier of the radio access network device.

Still further, the second request further includes at least one of a first identifier of the terminal device, an identifier of the first radio access network device, and current quality of service information of a user plane session connection, and the first identifier is used to uniquely identify the terminal device within a control range of a first core network device.

It should be noted that, for functions of the function modules of the first radio access network device 120 described in this embodiment of the present disclosure, refer to the related descriptions of the corresponding first radio access network device 120 in the embodiment shown in FIG. 5A and FIG. 5B. Details are not described herein again.

Figure 18:
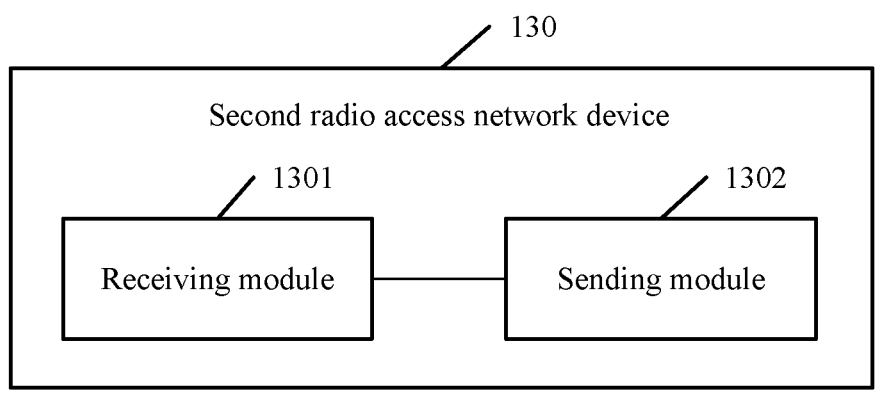
FIG. 18 is a schematic structural diagram of still another radio access network device according to an embodiment of the present disclosure.

FIG. 18 is a schematic structural diagram of still another radio access network device according to an embodiment of the present disclosure. The radio access network device is a second radio access network device. As shown in FIG. 18, a second radio access network device 130 includes a receiving module 1301 and a sending module 1302.

The receiving module 1301 is configured to receive a third request sent by a fourth core network device, where the third request includes related information used to instruct the second radio access network device to establish a user plane session connection to the fourth core network device, and the fourth core network device is configured to execute a user plane function and a session management function of a core network.

The sending module 1302 is configured to send, for the second radio access network device, a third request feedback to the fourth core network device in response to the third request, where the third request feedback includes session status information used to indicate whether the user plane session connection is successfully established.

It should be noted that, for functions of the function modules of the second radio access network device 130 described in this embodiment of the present disclosure, refer to the related descriptions of the corresponding second radio access network device 130 in the embodiment shown in FIG. 5A and FIG. 5B. Details are not described herein again.

Figure 19:
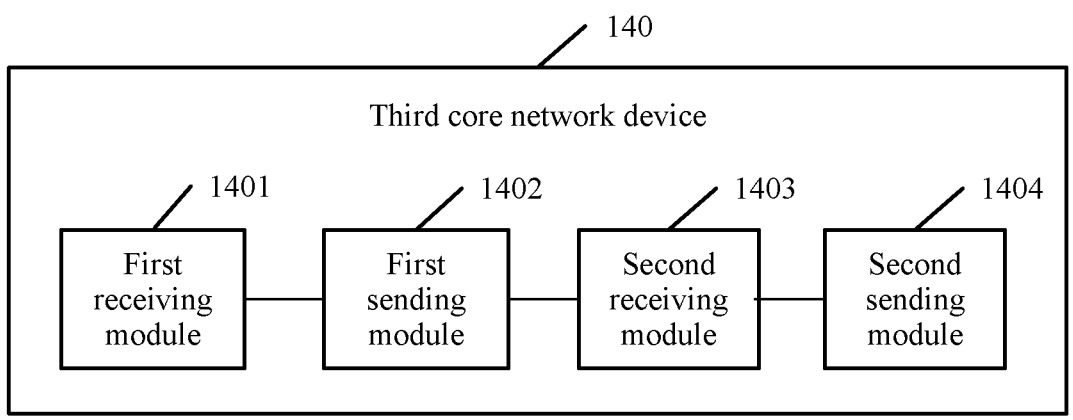
FIG. 19 is a schematic structural diagram of still another core network device according to an embodiment of the present disclosure.

FIG. 19 is a schematic structural diagram of still another core network device according to an embodiment of the present disclosure. The core network device is a third core network device. As shown in FIG. 19, a third core network device 140 includes a first receiving module 1401, a first sending module 1402, a second receiving module 1403, and a second sending module 1404.

The first receiving module 1401 is configured to receive an initial attach request sent by a first radio access network device, where the third core network device is configured to execute a common control plane function of a core network.

The first sending module 1402 is configured to send a session establishment request to a fourth core network device, where the fourth core network device is configured to execute a user plane function and a session management function of the core network.

The second receiving module 1403 is configured to receive a session establishment request feedback that is sent by the fourth core network device in response to the session establishment request, where the session establishment request feedback includes session identifiers of at least two user plane session connections, and the session identifier is used to indicate a session connection established between the first radio access network device and the fourth core network device and/or the session identifier is used to indicate a session connection established between a second radio access network device and the fourth core network device.

The second sending module 1404 is configured to send an initial attach request feedback to the first radio access network device in response to the initial attach request, where the initial attach request feedback includes the session identifiers of the at least two user plane session connections.

It should be noted that, for functions of the function modules of the third core network device 140 described in this embodiment of the present disclosure, refer to the related descriptions of the corresponding third core network device in the embodiment shown in FIG. 5A and FIG. 5B. Details are not described herein again.

Figure 20:
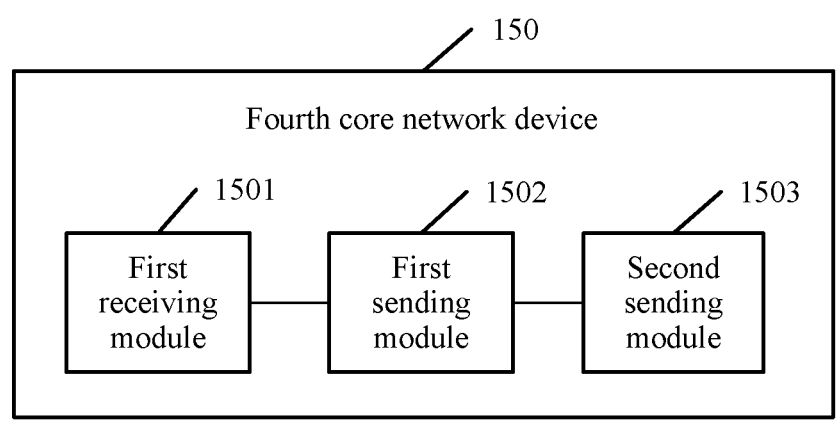
FIG. 20 is a schematic structural diagram of still another core network device according to an embodiment of the present disclosure.

FIG. 20 is a schematic structural diagram of still another core network device according to an embodiment of the present disclosure. The core network device is a fourth core network device. As shown in FIG. 20, a fourth core network device 150 includes a receiving module 1101 and a sending module 1102.

The first receiving module 1501 is configured to receive a session establishment request sent by a third core network device, where the third core network device is configured to execute a common control plane function of a core network, and the fourth core network device is configured to execute a user plane function and a session management function of the core network.

The first sending module 1502 is configured to send a second request to a first radio access network device and/or send a third request to a second radio access network device, where the second request includes related information used to instruct the first radio access network device to establish a user plane session connection to the fourth core network device, and the third request includes related information used to instruct the second radio access network device to establish a user plane session connection to the fourth core network device.

The second sending module 1503 is configured to send a session establishment request feedback to the third core network device in response to the session establishment request, where the session establishment request feedback includes session identifiers of at least two user plane session connections, and the session identifier is used to indicate a session connection established between the first radio access network device and the fourth core network device and/or the session identifier is used to indicate a session connection established between the second radio access network device and the fourth core network device.

Specifically, the fourth core network device 150 further includes:

a second receiving module, configured to: when the fourth core network device sends the second request to the first radio access network device, receive a second request feedback that is sent by the first radio access network device in response to the second request, where the second request feedback includes session status information used to indicate whether the user plane session connection between the first radio access network device and the fourth core network device is successfully established; and a third receiving module, configured to: when the fourth core network device sends the third request to the second radio access network device, receive a third request feedback that is sent by the first radio access network device in response to the third request, where the third request feedback includes session status information used to indicate whether the user plane session connection between the second radio access network device and the fourth core network device is successfully established.

It should be noted that, for functions of the function modules of the fourth core network device 150 described in this embodiment of the present disclosure, refer to the related descriptions of the corresponding fourth core network device in the embodiment shown in FIG. 5A and FIG. 5B. Details are not described herein again.

Figure 21:
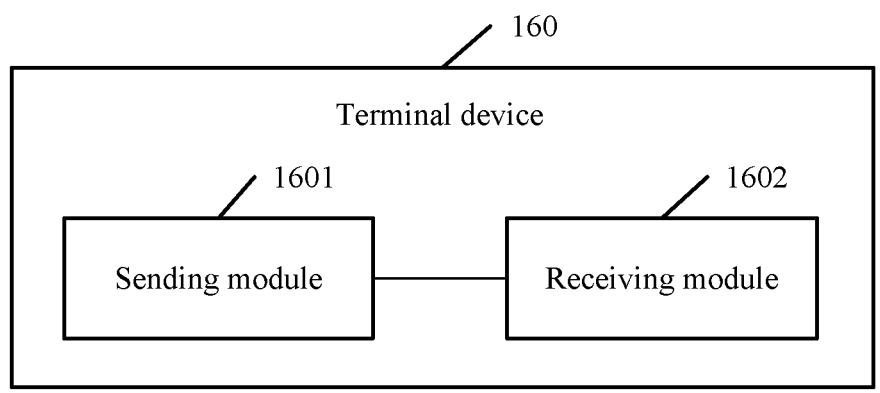
FIG. 21 is a schematic structural diagram of still another terminal device according to an embodiment of the present disclosure.

FIG. 21 is a schematic structural diagram of still another terminal device according to an embodiment of the present disclosure. As shown in FIG. 21, a terminal device 160 includes a sending module 1601 and a receiving module 1602.

The sending module 1601 is configured to send an initial attach request to a first radio access network device.

The receiving module 1602 is configured to receive session configuration information sent by the first radio access network device, where the session configuration information is sent after the first radio access network device receives an initial attach request feedback that is sent by a first core network device in response to the initial attach request, the session configuration information includes session identifiers of at least two user plane session connections, the session identifier is used to indicate a session connection established between the first radio access network device and a fourth core network device and/or the session identifier is used to indicate a session connection established between a second radio access network device and the fourth core network device, a third core network device is configured to execute a common control plane function of a core network, and the fourth core network device is configured to execute a user plane function and a session management function of the core network.

It should be noted that, for functions of the function modules of the terminal device 160 described in this embodiment of the present disclosure, refer to the related descriptions of the corresponding terminal device in the embodiment shown in FIG. 5A and FIG. 5B. Details are not described herein again.

An embodiment of the present disclosure further provides a computer storage medium. The computer storage medium may store a program. When the program runs, some or all of steps in any session connection establishment method recorded in the foregoing method embodiments are performed.

In the foregoing embodiments, the description of each embodiment has respective focuses. For a part that is not described in detail in an embodiment, refer to related descriptions in other embodiments.

It should be noted that, to make the description brief, the foregoing method embodiments are expressed as a series of actions. However, persons skilled in the art should appreciate that the present disclosure is not limited to the described action sequence, because according to the present disclosure, some steps may be performed in other sequences or performed simultaneously. In addition, persons skilled in the art should also appreciate that all the embodiments described in the specification are example embodiments, and the related actions and modules are not necessarily mandatory to the present disclosure.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, a network device, or the like, and may be specifically a processor in a computer device) to perform all or some of the steps of the foregoing methods described in the embodiments of the present disclosure. The foregoing storage medium may include any medium that can store program code, such as a USB flash drive, a removable hard disk, a magnetic disk, an optical disc, a read-only memory (ROM), or a random access memory (RAM).

The foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A session connection establishment method, the method comprising:
    receiving, by a first radio access network device, an initial attach request from a terminal device, wherein the initial attach request comprises a first initial attach request including at least one of: channel state information between the terminal device and the first radio access network device, channel state information between the terminal device and a second radio access network device, or an identifier of the second radio access network device that is accessible by the terminal device;
    sending, by the first radio access network device, the initial attach request to a first core network device;
    receiving, by the first radio access network device, an initial attach request feedback from the first core network device in response to the initial attach request, wherein the initial attach request feedback comprises session identifiers of at least two user plane session connections for different data services, wherein each session identifier indicates a session connection established between the first radio access network device and a second core network device and/or a session connection established between the second radio access network device and the second core network device, wherein the first core network device is configured to execute a common control plane function of a core network, and the second core network device is configured to execute a user plane function of the core network; and
    sending, by the first radio access network device, session configuration information to the terminal device, wherein the session configuration information comprises the session identifiers of the at least two user plane session connections.

2. The method according to claim 1, wherein:
    the initial attach request feedback further comprises an identifier of a radio access network device establishing a session connection to the second core network device and that corresponds to each of the at least two user plane session connections; and
    the session configuration information further comprises the identifier of the radio access network device.

3. The method according to claim 1, wherein:
    the initial attach request further comprises a second initial attach request that includes preset service identifiers respectively corresponding to at least two preset services of the terminal device and comprises at least one of the following: network slice identifiers respectively corresponding to the at least two preset services, an identifier of the first radio access network device, and the identifier of the second radio access network device, wherein the network slice identifier is used by the first core network device to select the second core network device from a corresponding network slice based on the network slice identifier.

4. The method according to claim 1, wherein the first initial attach request further comprises network slice capability information of the terminal device, and the network slice capability information indicates a quantity of network slices that are accessible by the terminal device and/or a network slice that is accessible by the terminal device.

5. The method according to claim 1, wherein before the sending, by the first radio access network device, the session configuration information to the terminal device, the method further comprises:
    sending, by the first radio access network device, a first request to the second radio access network device, wherein the first request comprises at least one of the following: a first identifier of the terminal device, at least one of the session identifiers of the at least two user plane session connections, and an identifier of the second core network device, and the first identifier is used to uniquely identify the terminal device within a control range of the first radio access network device; and
    receiving, by the first radio access network device, a first request feedback that is sent by the second radio access network device in response to the first request, wherein the first request feedback comprises at least one of establishment status information of the at least two user plane session connections, the identifier of the second radio access network device, a session identifier of a session connection that is in the at least one user plane session connection and that has been successfully established in the second radio access network device, and a second identifier allocated by the second radio access network device to the terminal device, and the second identifier is used to uniquely identify the terminal device within a coverage area of the second radio access network device.

6. The method according to claim 1, wherein the session configuration information further comprises session status information, wherein the session status information indicates a session status of a session connection corresponding to at least one of the session identifiers of the at least two user plane session connections, and the session status comprises a radio resource connection (RRC) connected mode, an RRC idle mode, and a third RRC mode.

7. A session connection establishment method, the method comprising:

sending, by a terminal device, an initial attach request to a first radio access network device, wherein the initial attach request comprises a first initial attach request including at least one of: channel state information between the terminal device and the first radio access network device, channel state information between the terminal device and a second radio access network device, or an identifier of the second radio access network device that is accessible by the terminal device; and receiving, by the terminal device, session configuration information sent by the first radio access network device, wherein the session configuration information is sent after the first radio access network device receives an initial attach request feedback that is sent by a first core network device in response to the initial attach request being sent from the first core network device to the first core network device, wherein the session configuration information comprises session identifiers of at least two user plane session connections for different data services, wherein each session identifier indicates a session connection established between the first radio access network device and a second core network device and/or a session connection established between the second radio access network device and the second core network device, wherein the first core network device is configured to execute a common control plane function of a core network, and the second core network device is configured to execute a user plane function of the core network.

8. The method according to claim 7, wherein:
the initial attach request feedback further comprises an identifier of a radio access network device establishing a session connection to the second core network device and that corresponds to each of the at least two user plane session connections; and
the session configuration information further comprises the identifier of the radio access network device.

9. The method according to claim 8, wherein the method further comprises:
performing, by the terminal device, data session transmission on the at least two user plane session connections based on the session identifiers and the identifier of the radio access network device.

10. The method according to claim 7, wherein the method further comprises:
performing, by the terminal device, data session transmission on the at least two user plane session connections based on the session identifier and the identifier of the radio access network device.

11. A first radio access network device, comprising:
a processor;
a memory configured to store instructions; and
a transceiver,
wherein the processor is configured to invoke the instructions stored in the memory, to cause the transceiver to perform operations comprising:
receiving, by the transceiver, an initial attach request sent by a terminal device, wherein the initial attach request comprises a first initial attach request including at least one of: channel state information between the terminal device and the first radio access network device, channel state information between the terminal device and a second radio access network device, or an identifier of the second radio access network device that is accessible by the terminal device;

sending, by the transceiver, the initial attach request to a first core network device;
receiving, by the transceiver, an initial attach request feedback from the first core network device in response to the initial attach request, wherein the initial attach request feedback comprises session identifiers of at least two user plane session connections for different data services, wherein each session identifier indicates a session connection established between the first radio access network device and a second core network device and/or a session connection established between the second radio access network device and the second core network device, wherein the first core network device is configured to execute a common control plane function of a core network, and the second core network device is configured to execute a user plane function of the core network; and
sending, by the transceiver, session configuration information to the terminal device by using the transceiver, wherein the session configuration information comprises the session identifiers of the at least two user plane session connections.

12. The first radio access network device according to claim 11, wherein:
the initial attach request feedback further comprises an identifier of a radio access network device establishing a session connection to the second core network device and that corresponds to each of the at least two user plane session connections; and
the session configuration information further comprises the identifier of the radio access network device.

13. The first radio access network device according to claim 11, wherein the initial attach request further comprises a second initial attach request that includes preset service identifiers respectively corresponding to at least two preset services of the terminal device and comprises at least one of the following: network slice identifiers respectively corresponding to the at least two preset services, an identifier of the first radio access network device, and the identifier of the second radio access network device, wherein the network slice identifier is used by the first core network device to select the second core network device from a corresponding network slice based on the network slice identifier.

14. The first radio access network device according to claim 11, wherein the first initial attach request further comprises network slice capability information of the terminal device, and the network slice capability information indicates a quantity of network slices that are accessible by the terminal device and/or a network slice that is accessible by the terminal device.

15. The first radio access network device according to claim 11, wherein before sending the session configuration information to the terminal device, the processor is further configured to cause the transceiver to perform operations comprising:
sending, by the transceiver, a first request to the second radio access network device, wherein the first request comprises at least one of the following: a first identifier of the terminal device, at least one of the session identifiers of the at least two user plane session connections, and an identifier of the second core network device, and the first identifier is used to uniquely identify the terminal device within a control range of the first radio access network device; and
receiving, by the transceiver, a first request feedback that is sent by the second radio access network device in response to the first request, wherein the first request feedback comprises at least one of establishment status information of the at least two user plane session connections, the identifier of the second radio access network device, a session identifier of a session connection that is in the at least one user plane session connection and that has been successfully established in the second radio access network device, and a second identifier allocated by the second radio access network device to the terminal device, and the second identifier is used to uniquely identify the terminal device within a coverage area of the second radio access network device.

16. The first radio access network device according to claim 11, wherein the session configuration information further comprises session status information, wherein the session status information indicates a session status of a session connection corresponding to at least one of the session identifiers of the at least two user plane session connections, and the session status comprises a radio resource connection (RRC) connected mode, an RRC idle mode, and a third RRC mode.

17. A terminal device, comprising:
a processor;
a memory configured to store instructions; and
a transceiver,
wherein the processor is configured to invoke the instructions stored in the memory to cause the transceiver to perform operations comprising:
sending, by the transceiver, an initial attach request to a first radio access network device, wherein the initial attach request comprises a first initial attach request including at least one of: channel state information between the terminal device and the first radio access network device, channel state information between the terminal device and a second radio access network device, or an identifier of the second radio access network device that is accessible by the terminal device; and
receiving, by the transceiver, session configuration information sent by the first radio access network device, wherein the session configuration information is sent after the first radio access network device receives an initial attach request feedback that is sent by a first core network device in response to the initial attach request being sent from the first core network device to the first core network device, wherein the session configuration information comprises session identifiers of at least two user plane session connections for different data services, wherein each session identifier indicates a session connection established between the first radio access network device and a second core network device and/or a session connection established between the second radio access network device and the second core network device, wherein the first core network device is configured to execute a common control plane function of a core network, and the second core network device is configured to execute a user plane function of the core network.

18. The terminal device according to claim 17, wherein:
the initial attach request feedback further comprises an identifier of a radio access network device establishing a session connection to the second core network device and that corresponds to each of the at least two user plane session connections; and
the session configuration information further comprises the identifier of the radio access network device.

19. The terminal device according to claim 18, wherein the processor is further configured to cause the transceiver to perform operations comprising:
perform data session transmission on the at least two user plane session connections based on the session identifiers and the identifier of the radio access network device.

20. The terminal device according to claim 17, wherein the processor is further configured to:
perform data session transmission on the at least two user plane session connections based on the session identifier and the identifier of the radio access network device.

* * * * *

UNITED STATES PATENT AND TRADEMARK OFFICE
CERTIFICATE OF CORRECTION

PATENT NO. : 11,026,274 B2
APPLICATION NO. : 16/370216
DATED : June 1, 2021
INVENTOR(S) : Jin et al.

It is certified that error appears in the above-identified patent and that said Letters Patent is hereby corrected as shown below:

On the Title Page

Page 2, Item (56) Other Publications, Line 11: "project, Valbonne, France (Feb. 23-26, 2016." should read -- project, Valbonne, France (Feb. 23-26, 2016). --.

Signed and Sealed this
Sixteenth Day of August, 2022

Katherine Kelly Vidal
*Director of the United States Patent and Trademark Office*